(12) United States Patent
Okada et al.

(10) Patent No.: US 12,402,665 B2
(45) Date of Patent: Sep. 2, 2025

(54) CARTRIDGE AND MANUFACTURING METHOD OF CARTRIDGE

(71) Applicant: Japan Tobacco Inc., Tokyo (JP)

(72) Inventors: Mitsuru Okada, Tokyo (JP); Masayuki Kimura, Tokyo (JP); Yuya Serizawa, Tokyo (JP)

(73) Assignee: JAPAN TOBACCO INC., Tokyo (JP)

(*) Notice: Subject to any disclaimer, the term of this patent is extended or adjusted under 35 U.S.C. 154(b) by 533 days.

(21) Appl. No.: 17/720,752

(22) Filed: Apr. 14, 2022

(65) Prior Publication Data

US 2022/0232901 A1 Jul. 28, 2022

Related U.S. Application Data

(63) Continuation of application No. PCT/JP2020/042577, filed on Nov. 16, 2020.

(51) Int. Cl.
*A24F 40/70* (2020.01)
*A24F 40/42* (2020.01)
(Continued)

(52) U.S. Cl.
CPC .............. *A24F 40/70* (2020.01); *A24F 40/42* (2020.01); *B05B 11/0002* (2013.01);
(Continued)

(58) Field of Classification Search
CPC .......... A24F 40/10; A24F 40/40; A24F 40/42; A24F 42/60; A24F 7/00; A24F 15/015;
(Continued)

(56) References Cited

U.S. PATENT DOCUMENTS 9,986,768 B2   6/2018 Force
2013/0213419 A1  8/2013 Tucker et al.
(Continued)

FOREIGN PATENT DOCUMENTS

CA   3 085 802 A1   6/2019
CN   103416853 A   12/2013
(Continued)

OTHER PUBLICATIONS

Russian Office Action and Search Report for Russian Application No. 2022112944, dated Nov. 9, 2022, with an English translation.
(Continued)

*Primary Examiner* — Michael H. Wilson
*Assistant Examiner* — Stephanie Lynn Moore
(74) *Attorney, Agent, or Firm* — Birch, Stewart, Kolasch & Birch, LLP

(57) ABSTRACT

Exposure of a leftover material at a cartridge that forms a vapor product is prevented. There is provided a cartridge that is assembled in a part of a vapor product that includes a heating element for heating an aerosol source. The cartridge includes a first component and a second component, at least one of which being formed of resin, and a connection section whose one end is connected to the first component and whose another end is joined or welded to the second component. The first component includes a first facing surface that faces the second component, and a first outermost edge of the first facing surface. The second component includes a second facing surface that faces the first component, and a second outermost edge of the second facing surface. The first outermost edge and the second component are not joined or welded to each other, and the second outermost edge and the first component are not joined or welded to each other.

12 Claims, 10 Drawing Sheets

(51) Int. Cl.
*B05B 11/00* (2023.01)
*B29C 65/00* (2006.01)
*B29C 65/08* (2006.01)
*B29L 31/00* (2006.01)

(52) U.S. Cl.
CPC .......... *B05B 11/0054* (2013.01); *B29C 65/08* (2013.01); *B29C 66/534* (2013.01); *B29L 2031/7414* (2013.01)

(58) Field of Classification Search
CPC ... A24F 15/01; A24F 5/10; A24F 1/14; A24D 1/20; A24D 1/02; A24D 1/042; A24D 1/04
See application file for complete search history.

(56) References Cited

U.S. PATENT DOCUMENTS

| | | | |
|---|---|---|---|
| 2014/0109921 | A1 | 4/2014 | Chen |
| 2014/0209106 | A1* | 7/2014 | Liu .................. A24F 40/40 131/329 |
| 2016/0324215 | A1* | 11/2016 | Mironov .................. H05B 3/06 |
| 2017/0341308 | A1 | 11/2017 | Lemay et al. |
| 2018/0184710 | A1 | 7/2018 | Tucker et al. |
| 2019/0053544 | A1* | 2/2019 | Yamada ................ A24F 40/485 |
| 2020/0214343 | A1 | 7/2020 | Fursa |

FOREIGN PATENT DOCUMENTS

| | | |
|---|---|---|
| CN | 103416853 B | 8/2016 |
| CN | 110274372 A | 9/2019 |
| EP | 2 711 534 B1 | 3/2018 |
| JP | 62-221526 A | 9/1987 |
| JP | 2002-18960 A | 1/2002 |
| JP | 2012-2342 A | 1/2012 |
| JP | 2012-241561 A | 12/2012 |
| JP | 2018-19681 A | 2/2018 |
| JP | 2020-503866 A | 2/2020 |
| KR | 10-2016-0016348 A | 2/2016 |
| SU | 531750 A1 | 10/1976 |
| WO | WO 2012/173322 A1 | 12/2012 |
| WO | WO 2017/048782 A1 | 3/2017 |
| WO | WO 2018/211390 A1 | 11/2018 |
| WO | WO 2019/048841 A1 | 3/2019 |
| WO | WO 2020/002924 A1 | 1/2020 |
| WO | WO 2020/023540 A1 | 1/2020 |
| WO | WO 2020/081849 A2 | 4/2020 |

OTHER PUBLICATIONS

Extended European Search Report for European Application No. 20954319.8, dated May 19, 2023.
Russian Office Action and Search Report for Russian Application No. 2022113062, dated Dec. 28, 2022, with an English translation.
Russian Office Action and Search Report for Russian Application No. 2022113066, dated Dec. 29, 2022, with an English translation.
International Search Report (in Japanese), issued in PCT/JP2020/042577, dated Dec. 22, 2020.
International Search Report for International Application No. PCT/JP2020/042573, dated Dec. 22, 2020.
International Search Report for International Application No. PCT/JP2020/042576, dated Dec. 22, 2020.
International Search Report for International Application No. PCT/JP2020/042580, dated Dec. 22, 2020.
English translation of International Search Report for International Application No. PCT/JP2020/042573, dated Dec. 22, 2020.
English translation of International Search Report for International Application No. PCT/JP2020/042576, dated Dec. 22, 2020.
English translation of International Search Report for International Application No. PCT/JP2020/042577, dated Dec. 22, 2020.
English translation of International Search Report for International Application No. PCT/JP2020/042580, dated Dec. 22, 2020.
Russian Office Action and Search Report for Russian Application No. 2022112958, dated Dec. 9, 2022, with English translation.
Extended European Search Report for European Application No. 20954320.6, dated Jul. 3, 2023.
Chinese Office Action and Search Report for Chinese Application No. 202080042003.5, dated Jan. 25, 2025, with English translation.
European Communication pursuant to Article 94(3) EPC for European Application No. 20 954 318.0, dated Apr. 29, 2025.
Chinese Office Action for Chinese Application No. 202080042003.5, dated Jun. 28, 2025, with English translation.

* cited by examiner

CARTRIDGE AND MANUFACTURING METHOD OF CARTRIDGE

CROSS REFERENCE TO RELATED APPLICATIONS

The present application is a continuation application of International Application No. PCT/JP2020/042577, filed on Nov. 16, 2020, which is hereby expressly incorporated by reference into the present application.

TECHNICAL FIELD

The present invention relates to a cartridge, and a manufacturing method of the cartridge.

BACKGROUND ART

Conventionally, heated tobacco products are known that are used to inhale an atmosphere containing aerosol, the aerosol being obtained by causing a dried leaf tobacco coming from plants in the genus *Nicotiana* tobacum, a reconstituted tobacco containing plants in the same genus, strips and granules of the reconstituted tobacco, and/or a mixture thereof to pass through vapor of alcohol, without burning the same, and by causing ingredients derived from a leaf tobacco and the like to transfer to a gas phase. Furthermore, there are known electronic tobacco products that are used to inhale an atmosphere in which vapor and outside air are mixed, the vapor being generated by atomizing or vaporizing aromatic alcoholic or aqueous solutions by an appropriate electric component (hereinafter, in the present specification, such heated tobacco products and electronic tobacco products will be collectively referred to as "vapor product(s)"). Such a vapor product includes a component for containing an aerosol source, a component for generating aerosol, a component forming a channel for aerosol, or the like. As such a component, a component made of resin is generally used from the standpoints of ease in processing, weight and the like.

In the process of manufacturing the vapor product, a resin component is sometimes joined or welded with another component. As methods of joining resin components or a resin component and a metal component that form the vapor product, there are known a laser welding method and an ultrasonic welding method (see PTLs 1 to 4).

CITATION LIST

Patent Literature

PTL 1: International Publication No. WO 2020/081849
PTL 2: International Publication No. WO 2020/023540
PTL 3: U.S. Patent Application No. 2020/0214343
PTL 4: Japanese Patent Laid-Open No. 2018-019681

SUMMARY OF INVENTION

Technical Problem

However, when welding two components as mentioned above, melted resin is pushed out from a joined part as the components are pressed against each other, and solidified resin (a leftover material) remains around the joined part. In the case where such a leftover material is present in an aerosol channel of a vapor product, aerosol passing through the aerosol channel may condense on the leftover material and liquid droplets may possibly be collected. As a result, the collected liquid droplets may flow into the mouth of a user, or performance of the vapor product may deviate from design due to a cross-sectional area of the aerosol channel being narrowed.

Furthermore, such a leftover material may fall off at a later stage in the manufacturing of the vapor product to be accumulated on a transfer route or to get mixed in the product. Even when the leftover material does not fall off, appearance of the vapor product is impaired. Particularly, in the case where the leftover material is formed on a tank (a cartridge) that forms the vapor product and that is mainly for containing an aerosol source, the leftover material that is exposed is possibly erroneously recognized as a foreign substance in the aerosol source. Furthermore, a semi-finished product on which the leftover material is generated deviates from design dimensions, and may easily fall down at a later stage and block the transfer route.

An object of the present invention is to prevent exposure of a leftover material at a cartridge that forms a vapor product.

Solution to Problem

According to a first mode, there is provided a cartridge that is assembled in a part of a vapor product that includes a heating element for heating an aerosol source. The cartridge includes a first component and a second component, at least one of which being formed of resin, and a connection section whose one end is connected to the first component and whose another end is joined or welded to the second component. The first component includes a first facing surface that faces the second component, and a first outermost edge of the first facing surface. The second component includes a second facing surface that faces the first component, and a second outermost edge of the second facing surface. The first outermost edge and the second component are not joined or welded to each other, and the second outermost edge and the first component are not joined or welded to each other.

When the first outermost edge or the second outermost edge is joined or welded to a component, a melted material (a leftover material) from these parts is exposed to outside the components. According to the first mode, the first outermost edge of the first component and the second outermost edge of the second component are not joined or welded to any part, and thus, the first outermost edge and the second outermost edge are not melted, and exposure of leftover materials therefrom to outside the components may be prevented. Additionally, in the present specification, the "first facing surface" of the first component and the "second facing surface" of the second component are surfaces of the first component and the second component that directly face each other in a direction in which the connection section extends between the first component and the second component. Members other than the connection section are not present between the facing surface of the first component and the facing surface of the second component. The "facing surfaces" of the first component and the second component may also be said to be surfaces that are at an angle relative to the direction in which the connection section extends between the first component and the second component.

A second mode is summarized as the cartridge according to the first mode, the cartridge including an aerosol channel where aerosol that is generated by evaporation of the aerosol source passes through, where at least a part of the aerosol channel is demarcated by at least one of the first component and the second component.

According to the second mode, because the aerosol channel is demarcated by at least one of the first component and the second component, a leftover material may be prevented from being exposed in such an aerosol channel, and condensation of aerosol on a leftover material may be prevented. Furthermore, as described above, the cartridge according to the second mode is formed of resin. Demarcation as described above of the aerosol channel by at least a part of the first component and the second component may be achieved by integrally die-molding each of the components in such a way that there is included a portion that forms a part of the recessed section mentioned above and there is included a portion at which at least a part of the component forms the aerosol channel. This enables an assembly step or a bonding step necessary in the case of molding separate bodies to be omitted, and because there are no fitting sections or bonded parts, the component can be easily handled and is not easily broken when a consumer holds it in his/her hand at the time of use in spite of being a small resin component. However, designs are restricted with respect to shapes of the recessed section and the aerosol channel in such a way that the two components may each be allowed to be integrally die-molded.

A third mode is summarized as the cartridge according to the first or second mode, the cartridge including a space capable of containing the aerosol source, where at least a part of the space is demarcated by at least one of the first component and the second component.

According to the third mode, because at least one of the first component and the second component demarcates a space that is capable of containing the aerosol source, exposure of a leftover material in such a space may be prevented, and erroneous recognition of mixing of a foreign substance in the aerosol source may be prevented. Furthermore, as described above, the cartridge according to the third mode citing the first mode and the second mode is formed of resin. Provision of the space that is capable of containing the aerosol source and demarcation of at least a part of the space by at least one of the first component and the second component described above may be achieved by integrally die-molding each of the components in such a way that there is included a portion that forms a part of the recessed section mentioned above or there is included a portion at which at least a part of the component forms the aerosol channel, and in such a way that there is included a portion that forms the space that is capable of containing the aerosol source. The effects described in the second mode may thus also be obtained.

A fourth mode is summarized as the cartridge according to any one of the first to third modes, where at least a part of the heating element is housed in at least one of the first component and the second component.

According to the fourth mode, because at least one of the first component and the second component houses at least a part of the heating element, exposure of a leftover material to such a heating element may be prevented. Furthermore, the cartridge according to the fourth mode may be easily used at the time of use by a consumer because assembly with the heating element is not required.

A fifth mode is summarized as the cartridge according to any one of the first to fourth modes, where the first outermost edge and the second outermost edge are not joined or welded to each other.

When the first outermost edge of the first component and the second outermost edge of the second component are joined or welded to each other, a leftover material is exposed from the first outermost edge and the second outermost edge. By contrast, according to the fifth mode, because the first outermost edge and the second outermost edge are not joined or welded to each other, exposure of a leftover material from the first outermost edge and the second outermost edge may be prevented.

A sixth mode is summarized as the cartridge according to the fifth mode, the cartridge including a gap between the first outermost edge and the second outermost edge.

According to the sixth mode, because there is a gap where a leftover material generated between the first component and the second component may be retained, exposure, to outside, of the leftover material generated from the connection section that is joined or welded to the second component may be better prevented.

A seventh mode is summarized as the cartridge according to any one of the first to sixth modes, where the second component includes a first opening formed in the second facing surface, and a first opening edge that demarcates at least a part of the first opening, and the first opening edge is not joined or welded to the first component.

According to the seventh mode, because the first opening edge is not joined or welded to the first component, a leftover material is not generated from the first opening edge, and exposure of a leftover material in the first opening may be prevented.

An eighth mode is summarized as the cartridge according to the seventh mode, where the first opening has an annular shape when seen along a direction in which the connection section extends between the first component and the second component, the first opening edge includes an opening outer edge and an opening inner edge that demarcate the first opening, and the opening outer edge and the opening inner edge are not joined or welded to the first component.

According to the eighth mode, because the opening outer edge and the opening inner edge are not joined or welded to the first component, exposure of a leftover material from the opening outer edge and the opening inner edge in the first opening may be prevented.

A ninth mode is summarized as the cartridge according to the eighth mode, where the second component includes a second opening that is formed in the second facing surface and that is positioned more inward from the first opening when seen along the direction in which the connection section extends between the first component and the second component, and a second opening edge that demarcates at least a part of the second opening, and the second opening edge is not joined or welded to the first component.

According to the ninth mode, because the second opening edge is not joined or welded to the first component, a leftover material is not generated from the second opening edge, and exposure of a leftover material in the second opening may be prevented.

A tenth mode is summarized as the cartridge according to any one of the first to ninth modes, where the first facing surface of the first component and the second facing surface of the second component are not joined or welded to each other.

According to the tenth mode, because the first facing surface of the first component and the second facing surface of the second component are not joined or welded to each other, a leftover material may be prevented from being generated from the first facing surface and the second facing surface, and as a result, exposure of a leftover material to outside may be prevented.

According to an eleventh mode, there is provided a manufacturing method of the cartridge according to any one of the first to tenth modes. In the manufacturing method of the cartridge, the first component is a lid member, and the second component is a cylindrical member. The manufacturing method of the cartridge includes connecting a heating assembly including the heating element to one end of the cylindrical member and closing an opening on the one end of the cylindrical member, filling an inside of the cylindrical member, to which the heating assembly is connected, with the aerosol source, and joining or welding the connection section to another end of the cylindrical member filled with the aerosol source.

When the aerosol source is put in a cylindrical member with a bottom to which the heating assembly is not assembled, up to assembly of the heating assembly has to be completed to prevent leakage of the aerosol source from the cylindrical member. By contrast, according to the eleventh mode, the heating assembly can be assembled with the cylindrical member before filling with the aerosol source is performed, and thus, for example, the cylindrical member to which the heating assembly is connected may be manufactured in advance as one unit and then be transported, and filling with the aerosol source and joining or welding of the lid member may be performed at another place.

A twelfth mode is summarized as the manufacturing method of the cartridge according to the tenth mode, the manufacturing method including ultrasonically welding the connection section of the lid member to the other end of the cylindrical member.

According to a thirteenth mode, there is provided a manufacturing method of the cartridge according to any one of the first to tenth modes. The manufacturing method of the cartridge includes joining or welding the other end of the connection section to the second component in such a way that the first facing surface of the first component and the second facing surface of the second component are not joined or welded to each other.

According to the thirteenth mode, because the first facing surface of the first component and the second facing surface of the second component are not joined or welded to each other, a leftover material may be prevented from being generated from the first facing surface and the second facing surface, and as a result, exposure of a leftover material to outside may be prevented.

DESCRIPTION OF EMBODIMENTS

Figure 1:
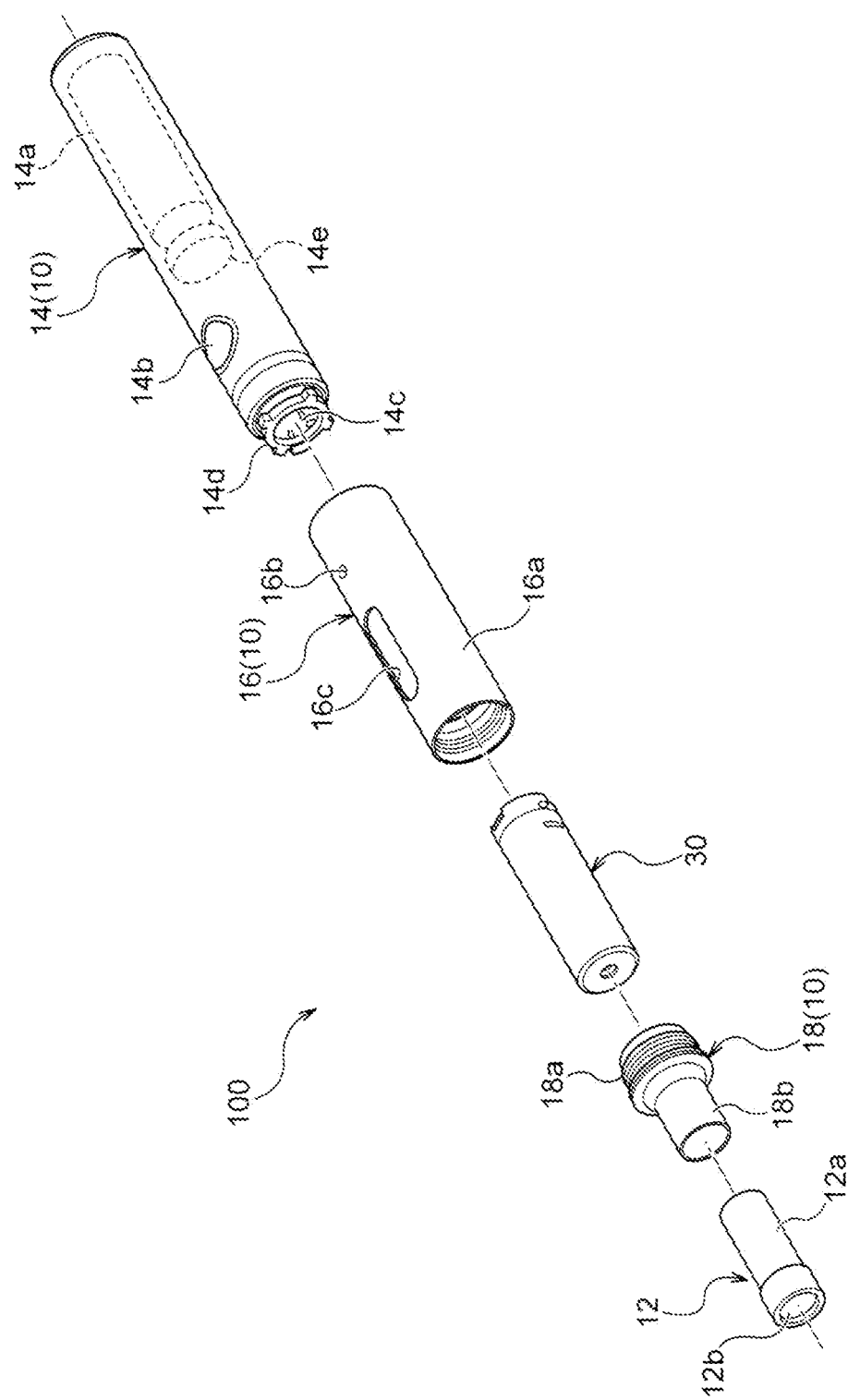
FIG. 1 is an exploded perspective view of a vapor product according to a present embodiment.

Hereinafter, an embodiment of the present invention will be described with reference to the drawings. In the drawings described below, same or corresponding structural elements are denoted by a same reference sign, and redundant description is omitted.

FIG. 1 is an exploded perspective view of a vapor product according to the present embodiment. A vapor product 100 is a device used to inhale an atmosphere containing aerosol, the aerosol being obtained by a method, among a plurality of methods for generating aerosol, of causing aerosol generated by heating an aerosol source extending outside from a container section of a cartridge by an electric heater or by atomizing the aerosol source by application of ultrasonic waves to pass through strips/granules of a reconstituted tobacco, and thereby causing ingredients derived from a leaf tobacco and the like to transfer to a gas phase. Additionally, the above example is not restrictive, and the vapor product 100 may be a device that is used to inhale aerosol containing aromatic components, with which an aerosol source mixing components such as nicotine/menthol, flavors and alcohol is heated or atomized.

As shown in FIG. 1, the vapor product 100 includes a main body unit 10, and a cartridge 30 and a tobacco capsule 12 that are detachably attached to the main body unit 10. The main body unit 10 includes a power supply unit 14, a holding unit 16, and a mouthpiece 18. The power supply unit 14, the holding unit 16, and the mouthpiece 18 are each formed into a cylindrical shape. The mouthpiece 18 may be screwed to one end of the holding unit 16, and the power supply unit 14 may be connected to the other end of the holding unit 16, for example. In the present specification, a direction along which the mouthpiece 18, the holding unit 16, and the power supply unit 14 are coupled will be referred to as a longitudinal direction.

The power supply unit 14 includes a battery 14a, a switch 14b, pin electrodes 14c, and an engaging section 14d. The battery 14a is housed inside the power supply unit 14. The switch 14b is capable of switching on or off the power of the vapor product 100 by being held down in a state where the vapor product 100 is assembled, for example. The pin electrodes 14c contact electrodes, described later, of the cartridge 30 and may electrically connect the battery 14a and the electrodes, when the vapor product 100 is assembled in a state where the cartridge 30 is housed inside the holding unit 16. The engaging section 14d may cause the holding unit 16 and the power supply unit 14 to be engaged with each other, by engaging with an engagement receiving section, not shown, inside the holding unit 16. The power supply unit 14 includes a controller 14e for controlling power to be supplied by the battery 14a to the electrodes of the cartridge 30. Furthermore, the power supply unit 14 may include a puff sensor, not shown. In this case, the controller 14e may control the battery 14a such that power is supplied by the battery 14a to the cartridge 30 when a puff is detected.

The holding unit 16 includes a cylindrical body 16a, and houses the cartridge 30 inside the cylindrical body 16a, with the electrodes, described later, of the cartridge 30 facing the power supply unit 14. By attaching the mouthpiece 18 to the holding unit 16 in a state where the cartridge 30 is housed in the holding unit 16, the cartridge 30 may be fixed inside the holding unit 16. The holding unit 16 includes, at the cylindrical body 16a, a window 16c for visually checking the aerosol source contained in the cartridge 30, and an air hole 16b for supplying air to the cartridge 30.

The mouthpiece 18 includes a screw section 18a to be screwed with the holding unit 16, and a cylindrical section 18b that extends in the longitudinal direction from the screw section 18a. A user may inhale aerosol generated by the vapor product 100 by holding the cylindrical section 18b in his/her mouth.

The tobacco capsule 12 includes a capsule section 12a for containing strips/granules of a reconstituted tobacco inside, and a filter section 12b. The capsule section 12a has a cylindrical shape, and a mesh is formed on an end surface on one side, for example, and an opening is formed in an end surface on the other side. The size of the mesh that is formed on the end surface on one side of the capsule section 12a may be designed in such a way that strips/granules of the reconstituted tobacco contained in the capsule section 12a do not escape from the capsule section 12a. The filter section 12b is fitted with the opening of the capsule section 12a to close the opening. The tobacco capsule 12 may be detachably attached into the cylindrical section 18b of the mouthpiece 18 in the longitudinal direction, from an opposite side from the holding unit 16.

The cartridge 30 stores a liquid aerosol source, and generates aerosol by atomizing the aerosol source when power is supplied from the power supply unit 14. The aerosol source may include at least one of water, propylene glycol, and glycerin, for example. A specific structure of the cartridge 30 will be described later. The cartridge 30 that includes an atomization function of atomizing the aerosol source in the manner described above is sometimes referred to as a cartomizer.

A method of using the vapor product 100 will be described. First, the switch 14b is pressed in a state where the vapor product 100 is assembled, and the power is switched on. Next, a user holds the cylindrical section 18b in his/her mouth and inhales. At this time, when inhalation by the user is detected by the puff sensor, not shown, of the power supply unit 14, power is supplied from the battery 14a of the power supply unit 14 to the electrodes of the cartridge 30, and aerosol is generated at the cartridge 30. The aerosol generated at the cartridge 30 passes through the strips/granules of the reconstituted tobacco inside the tobacco capsule 12 due to inhalation by the user, and is supplied into the mouth of the user together with ingredients derived from a leaf tobacco and the like.

Figure 2:
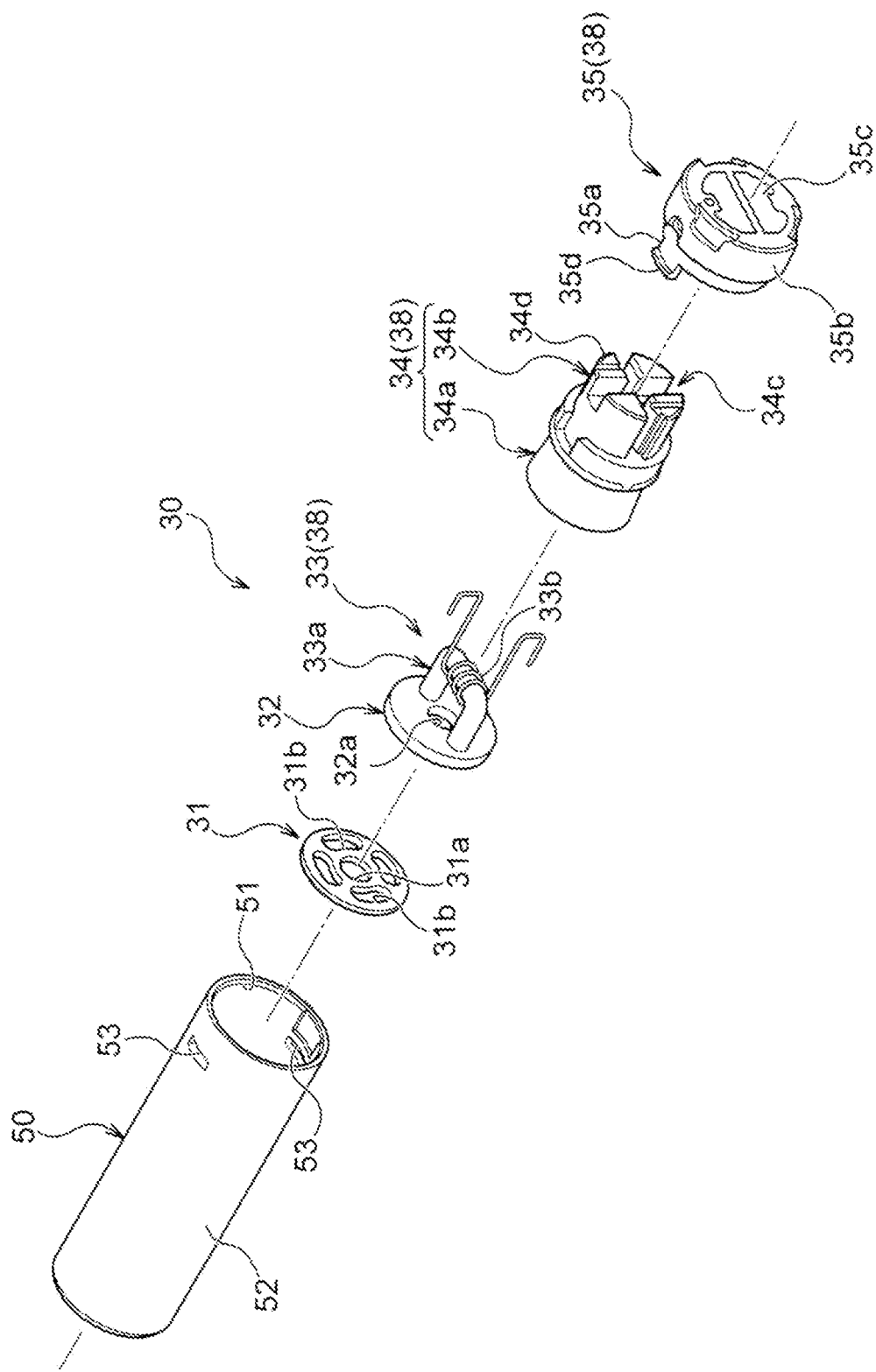
FIG. 2 is an exploded perspective view of a cartridge.

Next, a detailed description will be given of the cartridge 30 shown in FIG. 1. FIG. 2 is an exploded perspective view of the cartridge 30. As shown in FIG. 2, the cartridge 30 includes a tank 50 that has a bottomed cylindrical shape, a gasket 31 that is substantially disc-shaped and that is to be housed inside the tank 50, a mesh body 32 that is substantially disc-shaped, a heating section 33, an atomization container 34, and a heater holder 35.

The tank 50 includes an opening 51 through which the gasket 31, the mesh body 32, the heating section 33, the atomization container 34, and the heater holder 35 are to be inserted inside, a circumferential wall 52 that demarcates the opening 51, and a pair of engaging holes 53 formed in the circumferential wall 52. The engaging holes 53 are for fixing the heater holder 35 to the tank 50.

The gasket 31 is formed such that an outer diameter is substantially the same as an inner diameter of the tank 50. The gasket 31 performs positioning of the mesh body 32, and also, maintains the shape of the mesh body 32. The gasket 31 includes, at a center in a radial direction, an insertion hole 31a through which a channel tube 61 (see FIGS. 3A and 3B), described later, of the tank 50 can be inserted, and includes, around the insertion hole 31a, openings 31b (four in the drawing) that allow the aerosol source in the tank 50 to pass through. The gasket 31 is housed inside the tank 50 in such a way that the channel tube 61, described later, is inserted through the insertion hole 31a.

The mesh body 32 is disposed in contact with the gasket 31 in a manner covering the openings 31b of the gasket 31. The mesh body 32 is a porous medium made of fiber such as cotton, for example, and holds the aerosol source that passed through the openings 31b of the gasket 31. An insertion hole 32a that allows insertion of the channel tube 61, described later, is formed at a center of the mesh body 32 in the radial direction. The mesh body 32 is positioned when the channel tube 61, described later, is inserted through the insertion hole 32a and the mesh body 32 contacts the gasket 31.

The heating section 33 atomizes a liquid aerosol source. The heating section 33 includes a wick 33a that is substantially U-shaped, and a heating wire 33b (corresponding to an example of a heating element) wound around the wick 33a. The wick 33a is made of glass fiber or the like, and absorbs and holds the aerosol source held at the mesh body 32. Aerosol is generated when the aerosol source that is held at the wick 33a is heated and atomized by the heating wire 33b. In FIG. 2, the mesh body 32 and the heating section 33 are shown as one body, but the heating section 33 is housed inside the atomization container 34 and is connected to the heater holder 35, and forms a heating assembly 38 together with the atomization container 34 and the heater holder 35.

The atomization container 34 includes a container section 34a for housing the heating section 33, and a fitting section 34b to be fitted with the heater holder 35. The atomization container 34 is formed by an elastic member, such as a resin material such as silicone resin, for example. As illustrated, the fitting section 34b includes a groove section 34c that is cross-shaped, and projecting sections 34d formed by the groove section 34c. End portions of the heating wire 33b of the heating section 33 housed in the container section 34a enter the groove section 34c from holes, not shown, and are wound around the projecting sections 34d.

The heater holder 35 is formed into a substantially cup shape as a whole, and includes a side wall section 35a, a bottom wall section 35b, and a pair of electrodes 35c. The pair of electrodes 35c is exposed from a bottom surface of the bottom wall section 35b, as illustrated, and is also exposed on an inside of the side wall section 35a. The fitting section 34b of the atomization container 34 is fitted with the side wall section 35a. At this time, each of the end portions of the heating wire 33b wound around the projecting sections 34d of the fitting section 34b come into contact with one of the pair of electrodes 35c. The side wall section 35a includes a claw 35d that is to be engaged with the engaging hole 53 of the tank 50.

The heating assembly 38 is assembled by fitting the fitting section 34b of the atomization container 34 with the heater holder 35 and by housing the heating section 33 in the container section 34a of the atomization container 34. The heating assembly 38 is fixed to the tank 50, with the wick 33a of the heating section 33 in contact with the mesh body 32, by fitting the heating assembly 38 with the tank 50 and causing the claw 35d to be engaged with the engaging hole 53 of the tank 50. The opening 51 of the tank 50 is thereby closed by the heating assembly 38.

Next, the structure of the tank 50 shown in FIG. 2 will be described in detail. In the present embodiment, the tank 50 is formed from at least two components, and a connection section for connecting the two components to each other. Specifically, the tank 50 according to the present embodiment includes a tank main body 60 (corresponding to an example of a cylindrical member), and a lid 80 (corresponding to an example of a lid member), and the tank 50 is formed by connecting the tank main body 60 and the lid 80 to each other by the connection section (the tank main body 60 and the lid 80 each correspond to an example of a first component or a second component). In the present embodiment, the tank main body 60 and the lid 80 are both formed of resin, but this is not restrictive, and one of the tank main body 60 and the lid 80 may be formed of resin and the other one may be formed of a different material such as metal.

Figure 3A:
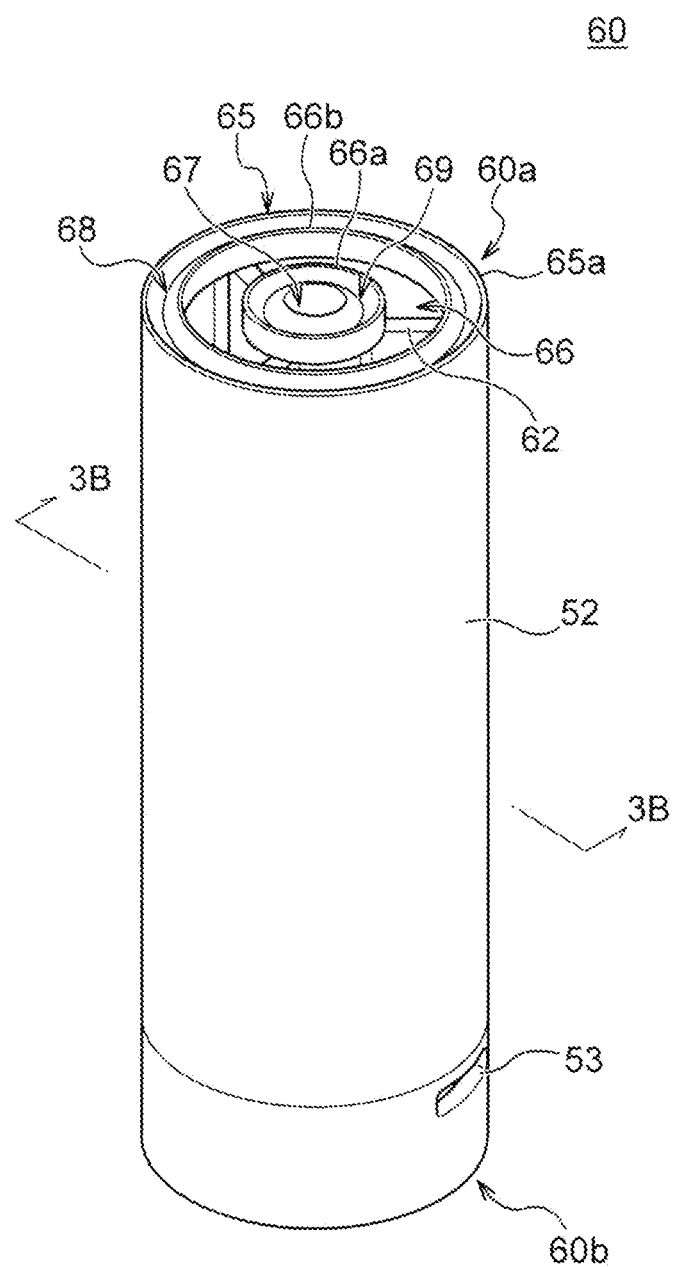
FIG. 3A is a perspective view of a tank main body.
Figure 3B:
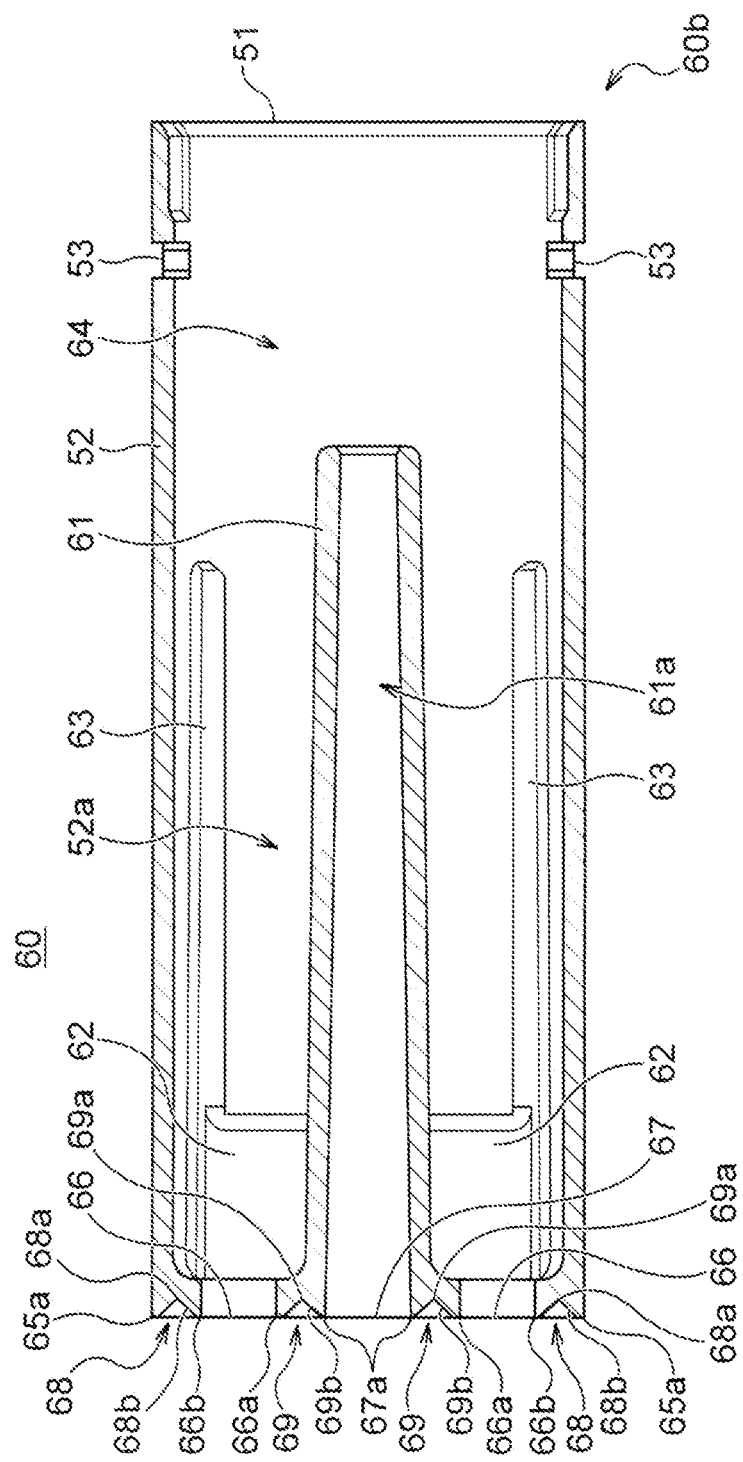
FIG. 3B is a cross-sectional view of the tank main body seen along arrows 3B-3B shown in FIG. 3A.

FIG. 3A is a perspective view of the tank main body 60. FIG. 3B is a cross-sectional view of the tank main body 60 seen along arrows 3B-3B shown in FIG. 3A. As shown in FIG. 3A, in the present specification, an end portion of the tank main body 60 on the mouthpiece 18 side will be referred to as a first end portion 60a, and an end portion on an opposite side will be referred to as a second end portion 60b. As shown in FIGS. 3A and 3B, the tank main body 60 includes the circumferential wall 52 and the channel tube 61. The circumferential wall 52 demarcates a part of a space 52a where the aerosol source can be contained. The channel tube 61 demarcates a part of an aerosol channel 61a where aerosol that is generated by evaporation of the aerosol source passes through. In the present specification, a direction in which the channel tube 61 and the circumferential wall 52 extend is referred to as a longitudinal direction. The channel tube 61 is disposed within the circumferential wall 52, and demarcates a part of the space 52a together with the circumferential wall 52. In other words, the space 52a is formed between an inner surface of the circumferential wall 52 and an outer surface of the channel tube 61. As shown in FIG. 3B, the channel tube 61 extends to the first end portion 60a of the tank main body 60, and forms a part of an end surface of the first end portion 60a. In the illustrated example, the tank main body 60 is formed into a cylindrical or columnar shape as a whole, but may be formed into any shape such as a square cylindrical shape without being limited to the examples mentioned above.

A plurality of ribs 62 (in the illustrated example, three) are provided between the inner surface of the circumferential wall 52 and the outer surface of the channel tube 61, in a manner extending between the circumferential wall 52 and the channel tube. That is, the ribs 62 support the channel tube 61. In the illustrated example, the ribs 62 are provided on the first end portion 60a side of the tank main body 60, and are disposed at equal intervals in a circumferential direction while being disposed radially when seen along the longitudinal direction.

On the inner surface of the circumferential wall 52, protruding sections 63 are integrally formed with the ribs 62. The protruding section 63 extends in the longitudinal direction, from the rib 62 toward the second end portion 60b. The protruding section 63 extends from an end portion, of the rib 62, on the second end portion 60b side to before a tip end, of the channel tube 61, on the second end portion 60b side.

The protruding sections 63 increase mechanical strength of the tank main body 60, and also perform positioning of the gasket 31.

The tank main body 60 includes the opening 51 for inserting the gasket 31, the mesh body 32 and the heating assembly 38 shown in FIG. 2. At least a part of the heating assembly 38 including the heating wire 33b is housed in a space 64 in the tank main body 60, on a side more to the second end portion 60b than the channel tube 61. A part of the heating assembly 38 may protrude outside the tank main body 60 without being housed in the space 64.

The tank main body 60 includes, on the first end portion 60a, a facing surface 65 (corresponding to an example of a second facing surface) that faces the lid 80 described later. The facing surface 65 of the tank main body 60 here refers to a surface that directly faces the lid 80 in a direction along which a first connection section 90 and a second connection section 92, described later, extend (the longitudinal direction). In the following, the direction along which the first connection section 90 and the second connection section 92 extend will sometimes be referred to as the longitudinal direction. The facing surface 65 can also be said to be a surface that directly faces the lid 80 and that is at an angle relative to the longitudinal direction. Accordingly, an outer surface of the circumferential wall 52 of the tank main body 60 extends substantially in parallel to the longitudinal direction and is thus not a facing surface with respect to the lid 80, and an end surface of the second end portion 60b of the tank main body 60 does not directly face the lid 80 and is thus not a facing surface. As shown in FIG. 3B, the facing surface 65 includes an outermost edge 65a (corresponding to an example of a second outermost edge). In the illustrated example, the outermost edge 65a has a circular shape when seen along the longitudinal direction, but the outermost edge 65a may be formed into any shape without being limited thereto.

As shown in FIGS. 3A and 3B, a first opening 66 may be formed in the facing surface 65. In the illustrated example, the first opening 66 is formed into an annular shape when seen along the longitudinal direction, and is demarcated by an opening inner edge 66a (corresponding to an example of a first opening edge) and an opening outer edge 66b (corresponding to an example of the first opening edge) formed on the facing surface 65. Accordingly, the opening inner edge 66a and the opening outer edge 66b each have a circular shape when seen along the longitudinal direction. In this case, the opening inner edge 66a and the opening outer edge 66b are desirably positioned concentrically. In the present embodiment, the first opening 66 communicates with the space 52a where the aerosol source can be contained.

Furthermore, a second opening 67 may be further formed in the facing surface 65. In the illustrated example, the second opening 67 is formed into a circular shape when seen along the longitudinal direction, and is demarcated by a second opening edge 67a formed on the facing surface 65. Accordingly, the second opening edge 67a has a circular shape when seen along the longitudinal direction. In the present embodiment, the second opening 67 communicates with the aerosol channel 61a. Additionally, in the present embodiment, the shape of the second opening 67 is circular, but this is not restrictive, and the shape may be an annular shape like that of the first opening 66, and in this case, the second opening edge 67a demarcates a part of the second opening 67 as an opening edge on an outer side.

As shown in FIGS. 3A and 3B, the facing surface 65 may include a first recessed section 68 (corresponding to an example of a recessed section) provided between the outermost edge 65a and the opening outer edge 66b, and a second recessed section 69 (corresponding to an example of the recessed section) provided between the opening inner edge 66a and the second opening edge 67a. At least one of the first recessed section 68 and the second recessed section 69 may be provided on the facing surface 65. Alternatively, it is also possible to omit the first recessed section 68 and the second recessed section 69.

As shown in FIG. 3A, in the present embodiment, the first recessed section 68 and the second recessed section 69 are annular grooves that extend along the circumferential direction of the tank main body 60. However, such a case is not restrictive, and planar shapes of the first recessed section 68 and the second recessed section 69 may take any shape. As shown in FIG. 3B, the first recessed section 68 includes a bottom section 68a and a side wall section 68b. In the illustrated example, the side wall section 68b has a tapered surface 68b that causes the width of the first recessed section 68 to be reduced toward the bottom section 68a. Furthermore, the second recessed section 69 includes a bottom section 69a and a side wall section 69b. In the illustrated example, the side wall section 69b includes a tapered surface 69b that causes the width of the second recessed section 69 to be reduced toward the bottom section 69a.

Figure 4A:
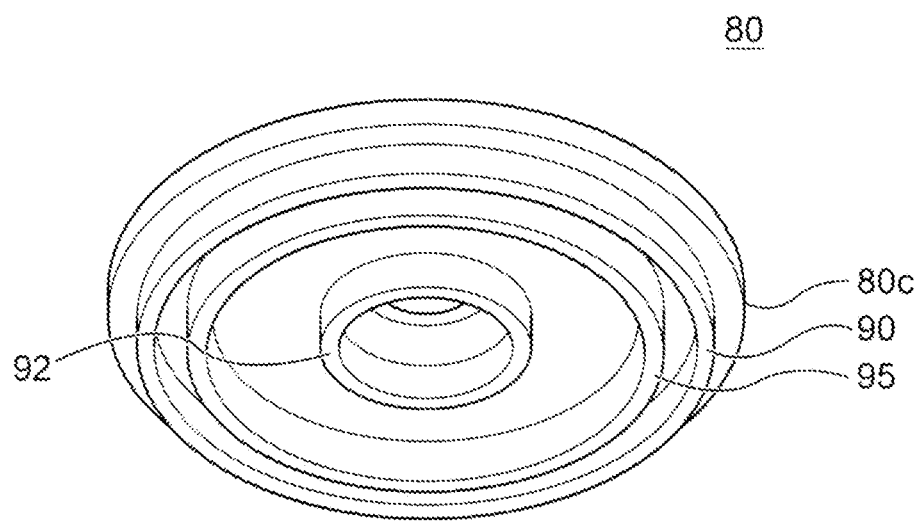
FIG. 4A is a perspective view of a lid.
Figure 4B:
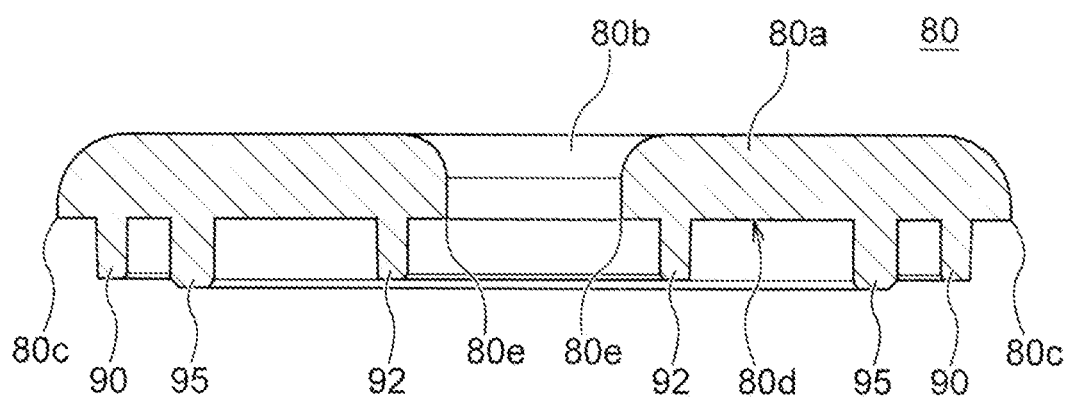
FIG. 4B is a cross-sectional view including a center of the lid.

FIG. 4A is a perspective view of the lid 80. FIG. 4B is a cross-sectional view including a center of the lid 80. As shown in FIGS. 4A and 4B, the lid 80 includes a flat plate section 80a that is substantially disc-shaped. An opening 80b that communicates with the second opening 67 of the tank main body 60 may be provided at substantially center of the flat plate section 80a. The lid 80 is provided with a first connection section 90 (corresponding to an example of a connection section) and a second connection section 92 (corresponding to an example of the connection section), the first connection section 90 and the second connection section 92 each having one end thereof connected to one surface of the flat plate section 80a. The first connection section 90 or the second connection section 92 may be integrally formed with the lid 80 or may be connected to the lid 80 by being joined or welded. Furthermore, it is also possible to provide the lid 80 with only one of the first connection section 90 and the second connection section 92. Other ends of the first connection section 90 and the second connection section 92 are joined or welded to the tank main body 60. When seen along a direction in which the second connection section 92 extends between the lid 80 and the tank main body 60, the second connection section 92 is positioned more inward from the first connection section 90. Furthermore, as shown in FIG. 4A, the first connection section 90 and the second connection section 92 may be ridge sections having an annular shape when seen along the direction in which the first connection section 90 and the second connection section 92 extend between the lid 80 and the tank main body 60 (the longitudinal direction). In FIG. 4B, a cross-sectional shape of each of the ridge sections is rectangular, but the shape is not limited thereto and may be polygonal, such as triangular, or may be circular with the ridge section having a round tip end. Furthermore, the cross-sectional shape of the ridge section and a cross-sectional shape of the first recessed section 68 or the second recessed section 69 are desirably not similar to each other. Furthermore, the first connection section 90 and the second connection section 92 are desirably disposed substantially concentrically on a cross-section perpendicular to the longitudinal direction. The aerosol channel 61a that can be housed at a center of the tank 50 and that is separate from the space 52a may thus be formed.

The other end of the first connection section 90 is joined or welded to the first recessed section 68 of the tank main body 60. A melted material (a leftover material) that is generated when the first connection section 90 is joined or welded may thus be accumulated in the first recessed section 68. Accordingly, the leftover material from the first connection section 90 may be prevented from being exposed between the lid 80 and the tank main body 60. Furthermore, the other end of the first connection section 90 may be joined or welded to the facing surface 65 of the tank main body 60, at a position away from the outermost edge 65a of the facing surface 65. This may prevent the leftover material from the first connection section 90 from being exposed from the outermost edge 65a of the facing surface 65 of the tank main body 60. Moreover, the other end of the first connection section 90 may be joined or welded to the facing surface 65 of the tank main body 60, at a position away from the opening outer edge 66b. This may prevent the leftover material from the first connection section 90 from being exposed in the first opening 66. The other end of the first connection section 90 is desirably joined or welded to the bottom section 68a of the first recessed section 68. This allows the leftover material from the first connection section 90 to be accumulated in the bottom section 68a, and the leftover material may be efficiently contained in the first recessed section 68.

The other end of the second connection section 92 is joined or welded to the second recessed section 69 of the tank main body 60. A melted material (a leftover material) that is generated when the second connection section 92 is joined or welded may thus be accumulated in the second recessed section 69. Accordingly, the leftover material from the second connection section 92 may be prevented from being exposed between the lid 80 and the tank main body 60. The other end of the second connection section 92 may be joined or welded to the facing surface 65 of the tank main body 60, at a position away from the opening inner edge 66a. This may prevent the leftover material from the second connection section 92 from being exposed in the first opening 66. Furthermore, the other end of the second connection section 92 may be joined or welded to the facing surface 65, at a position away from the second opening edge 67a. This may prevent the leftover material from the second connection section 92 from being exposed in the second opening 67. The other end of the second connection section 92 is desirably joined or welded to the bottom section 69a of the second recessed section 69. This allows the leftover material from the second connection section 92 to be accumulated in the bottom section 69a, and the leftover material may be efficiently contained in the second recessed section 69. The first connection section 90 and the second connection section 92 are desirably capable of being welded to the tank main body 60 by ultrasonic welding.

The lid 80 includes a facing surface 80d (corresponding to an example of a first facing surface) that faces the tank main body 60. The facing surface 80d of the lid 80 here refers to a surface that directly faces the tank main body 60 in the longitudinal direction. The facing surface 80d can also be said to be a surface that directly faces the tank main body 60 and that is at an angle relative to the longitudinal direction. As shown in FIG. 4B, the facing surface 80d includes an outermost edge 80c (corresponding to an example of a first outermost edge). In the illustrated example, the outermost edge 80c has a circular shape when seen along the longitudinal direction, but the outermost edge 80c may be formed into any shape without being limited thereto. Furthermore, the facing surface 80*d* includes an opening edge 80*e* that demarcates the opening 80*b*. The opening edge 80*e* can also be said to be an innermost edge of the lid 80.

The lid 80 is connected to the tank main body 60 by the first connection section 90 and the second connection section 92, and the first opening 66 of the tank main body 60 is thereby closed. At this time, the lid 80 demarcates a part of the aerosol channel 61*a*, and the opening 80*b* of the lid 80 forms a part of the aerosol channel 61*a*. Furthermore, the lid 80 demarcates a part of the space 52*a* where the aerosol source can be contained, by the first opening 66 of the tank main body 60 being closed by the lid 80.

The lid 80 is further provided with a guide section 95 that extends from the facing surface 80*d* of the lid 80. As shown in FIG. 4A, the guide section 95 may be formed into an annular shape when seen along the longitudinal direction. The guide section 95 may have any shape, and a plurality of pin-shaped guide sections 95 may be provided, for example. In the present embodiment, the guide section 95 is to fit into the first opening 66 of the tank main body 60. More specifically, the guide section 95 is to fit with the opening outer edge 66*b* that demarcates the first opening 66. The lid 80 may thus be positioned relative to the tank main body 60 at the time of joining or welding the first connection section 90 and the second connection section 92 to the tank main body 60. At this time, because the guide section 95 is fitted with the opening outer edge 66*b* of the first opening 66, exposure of the leftover material generated from the first connection section 90 toward the first opening 66 may be prevented by the guide section 95. In other words, the guide section 95 may prevent the leftover material from the first connection section 90 from entering the first opening 66.

The guide section 95 may be provided on the lid 80 in such a way as to be fitted with the opening inner edge 66*a* that demarcates the first opening 66. Furthermore, two guide sections 95 may be provided on the lid 80 to be fitted with both the opening inner edge 66*a* and the opening outer edge 66*b*. As shown in FIG. 4B, the guide section 95 is desirably longer than the first connection section 90 or the second connection section 92 in the longitudinal direction.

Figure 5A:
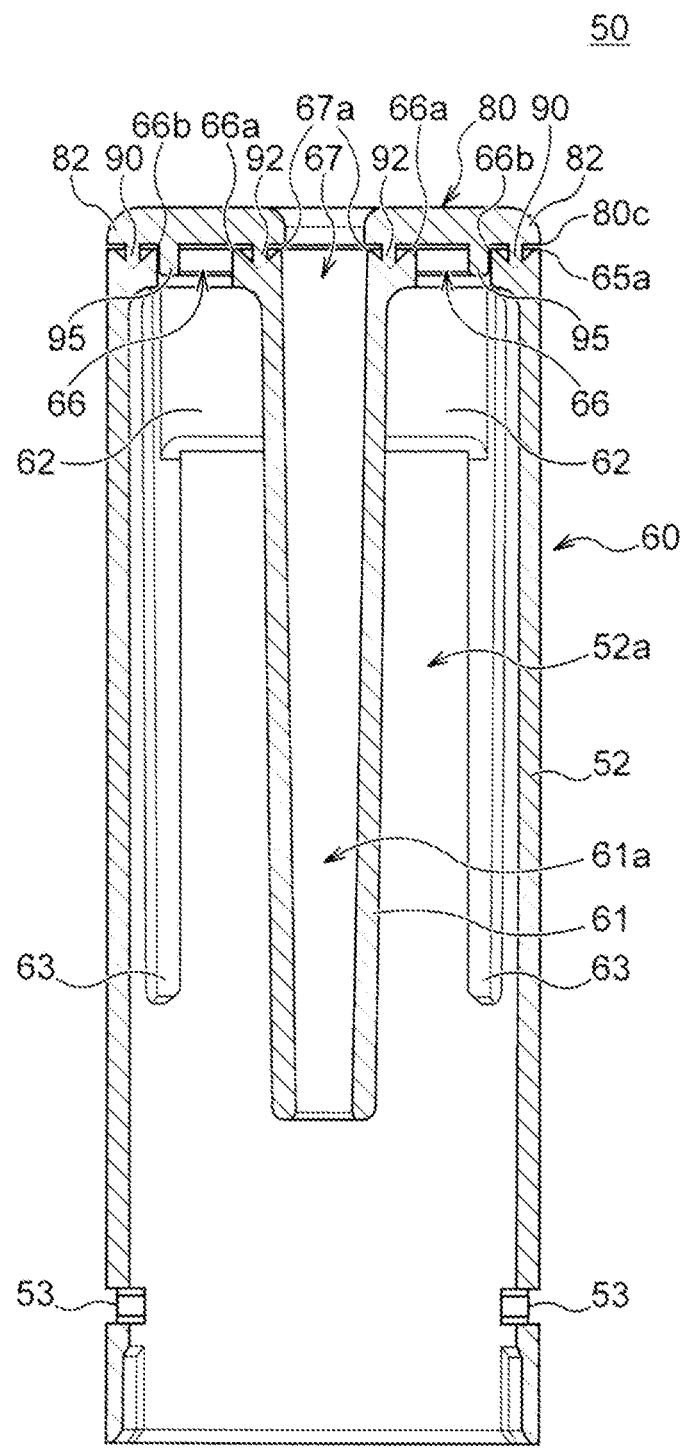
FIG. 5A is a cross-sectional view cutting a tank along a longitudinal direction.
Figure 5B:
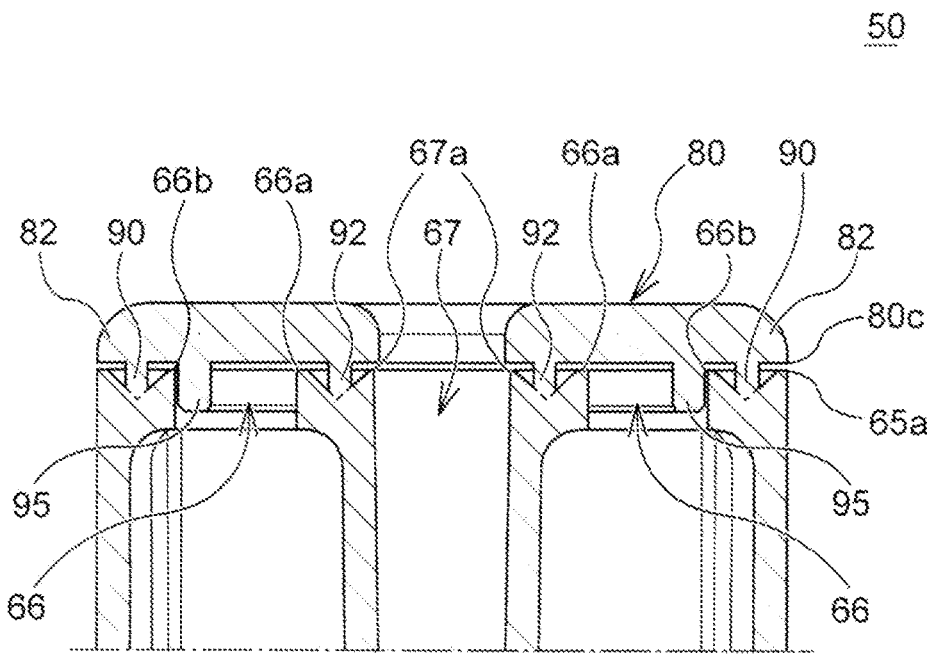
FIG. 5B is an enlarged view of a connection section between the lid and the tank main body shown in FIG. 5A.

FIG. 5A is a cross-sectional view cutting the tank 50 along the longitudinal direction. FIG. 5B is an enlarged view of the connection section between the lid 80 and the tank main body 60 shown in FIG. 5A. As shown in FIGS. 5A and 5B, the lid 80 includes an extending section 82 that extends, in a direction perpendicular to the longitudinal direction, from a connection part between the first connection section 90 and the lid 80 toward the outermost edge 65*a* of the tank main body. The leftover material from the first connection section 90 may thus be prevented from being exposed to outside from a gap between the lid 80 and the tank main body 60.

As shown in FIGS. 5A and 5B, the guide section 95 is not joined or welded to the tank main body 60. Accordingly, generation, from the guide section 95, of a leftover material that is generated by melting of the guide section 95 may be prevented. Furthermore, as illustrated, when seen along the direction perpendicular to the direction (the longitudinal direction) of extension of the first connection section 90 and the second connection section 92 between the lid 80 and the tank main body 60, the guide section 95 is disposed to overlap a connection portion between the first connection section 90 and the first recessed section 68. Accordingly, a leftover material that is generated when the first connection section 90 is joined or welded to the tank main body 60 (the first recessed section 68) is covered by the guide section 95, and may be prevented from being exposed in the first opening 66.

Furthermore, in the present embodiment, in a state where the lid 80 is joined to the tank main body 60, a gap is present between the outermost edge 80*c* of the lid 80 and the tank main body 60, and these are not joined or welded. Furthermore, a gap is also present between the outermost edge 65*a* of the facing surface 65 of the tank main body 60 and the lid 80, and these are not joined or welded. When the outermost edge 80*c* of the lid 80 or the outermost edge 65*a* of the tank main body 60 is joined or welded to a component, a material (a leftover material) generated by melting of such a part is possibly exposed to outside the tank 50. By contrast, according to the present embodiment, the outermost edge 80*c* of the lid 80 or the outermost edge 65*a* of the tank main body 60 is not joined or welded to any part, and thus, the outermost edge 80*c* and the outermost edge 65*a* are not melted, and exposure of leftover materials therefrom to outside the tank 50 may be prevented. More specifically, in the present embodiment, the outermost edge 80*c* of the lid 80 and the outermost edge 65*a* of the tank main body 60 are desirably not joined or welded to each other. When the outermost edge 80*c* of the lid 80 and the outermost edge 65*a* of the tank main body 60 are joined or welded to each other, a leftover material is possibly exposed from the outermost edge 80*c* and the outermost edge 65*a*. By contrast, in the case where the outermost edge 80*c* of the lid 80 and the outermost edge 65*a* of the tank main body 60 are not joined or welded to each other, exposure of a leftover material from the outermost edge 80*c* and the outermost edge 65*a* may be prevented.

As shown in FIGS. 5A and 5B, the tank 50 may include a gap between the outermost edge 80*c* of the lid 80 and the outermost edge 65*a* of the tank main body 60. This allows a leftover material generated between the lid 80 and the tank main body 60 to be accumulated in the gap, and thus, leftover materials generated from the first connection section 90 and the second connection section 92 may be accumulated in the gap, and exposure of the leftover materials to outside the tank 50 may be better prevented.

As shown in FIGS. 5A and 5B, with the tank 50, the opening inner edge 66*a* or the opening outer edge 66*b* of the first opening 66 is desirably not joined or welded to the lid 80. Generation of a leftover material from the opening inner edge 66*a* or the opening outer edge 66*b* is thereby prevented, and exposure of a leftover material in the first opening 66 (the space 52*a*) may be prevented, and erroneous recognition of mixing of a foreign substance in the aerosol source may be prevented.

As shown in FIGS. 5A and 5B, with the tank 50, the second opening edge 67*a* of the second opening 67 is desirably not joined or welded to the lid 80. Generation of a leftover material from the second opening edge 67*a* is thereby prevented, and exposure of a leftover material in the second opening 67 (the aerosol channel 61*a*) may be prevented, and aerosol may be prevented from condensing on the leftover material. Furthermore, with the tank 50, the opening edge 80*e* that demarcates the opening 80*b* of the lid 80 is desirably not joined or welded to the tank main body 60. Generation of a leftover material from the opening edge 80*e* is thereby prevented, and exposure of a leftover material in the opening 80*b* may be prevented.

As shown in FIGS. 5A and 5B, the facing surface 80*d* of the lid 80 and the facing surface 65 of the tank main body 60 are desirably not joined or welded to each other. In other words, the lid 80 and the tank main body 60 are desirably fixed to each other only by the first connection section 90 and the second connection section 92. Generation of a leftover material from the facing surface 80*d* and the facing surface 65 is thereby prevented, and as a result, exposure of a leftover material to outside may be prevented.

As shown in FIGS. 5A and 5B, a part of the first recessed section 68 of the tank main body 60 is desirably filled by a part of the first connection section 90 of the lid 80 (including a leftover material). In other words, the first recessed section 68 is desirably not completely filled by the first connection section 90. The first recessed section 68 is thereby able to contain all the leftover material that is generated by melting of the first connection section 90, and the leftover material may be prevented from sticking out from the first recessed section 68. Furthermore, a part of the second recessed section 69 of the tank main body 60 is desirably filled by a part of the second connection section 92 of the lid 80 (including a leftover material). In other words, the second recessed section 69 is desirably not completely filled by the second connection section 92. The second recessed section 69 is thereby able to contain all the leftover material that is generated by melting of the second connection section 92, and the leftover material may be prevented from sticking out from the second recessed section 69.

Figure 6A:
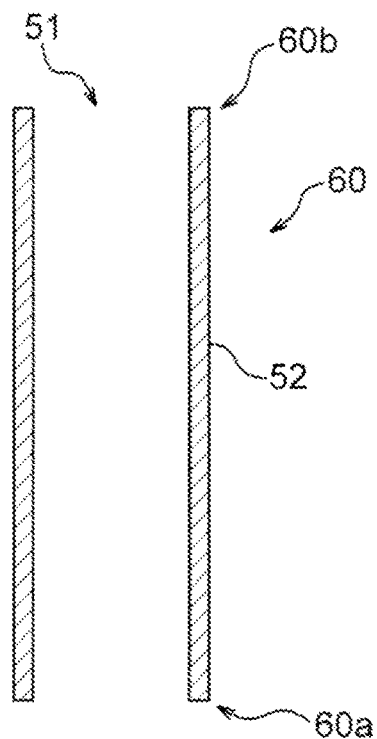
FIG. 6A is a schematic view showing a manufacturing process of the cartridge.

Next, a manufacturing method of the cartridge 30 of the vapor product 100 will be described. FIGS. 6A to 6F are schematic views showing a manufacturing process of the cartridge 30. As shown in FIG. 6A, first, the tank main body 60 for forming the cartridge 30 is prepared. At this time, the tank main body 60 may be installed with the second end portion 60*b* positioned at the top. Additionally, in FIG. 6A, only the circumferential wall 52 of the tank main body 60 is shown, and illustration of other structural elements is omitted.

Figure 6B:
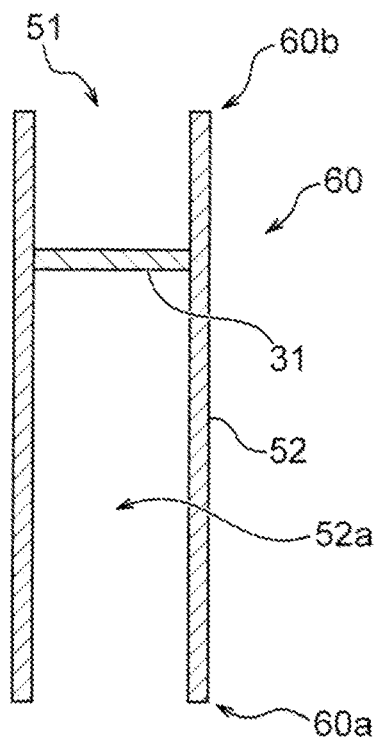
FIG. 6B is a schematic view showing the manufacturing process of the cartridge.
Figure 6C:
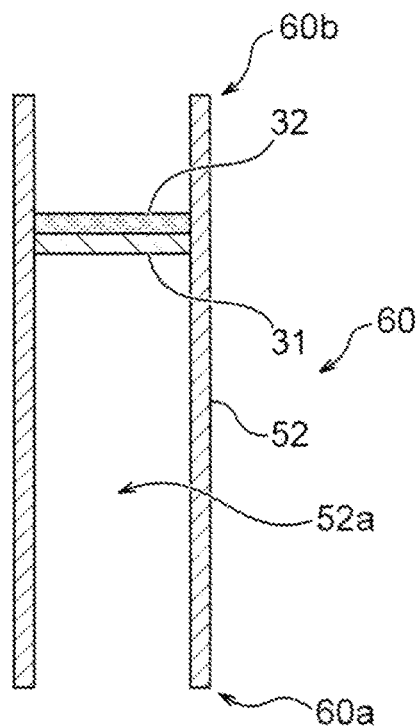
FIG. 6C is a schematic view showing the manufacturing process of the cartridge.
Figure 6D:
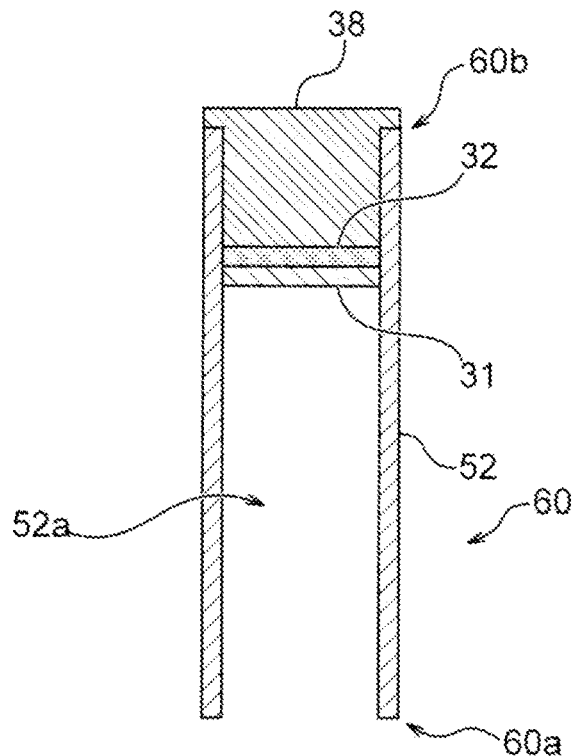
FIG. 6D is a schematic view showing the manufacturing process of the cartridge.

As shown in FIG. 6B, the gasket 31 is disposed inside the tank main body 60 from the opening 51 of the tank main body 60. At this time, the channel tube 61 of the tank main body 60 is inserted through the insertion hole 31*a* (see FIG. 2) of the gasket 31, and positioning of the gasket 31 is performed by the protruding sections 63 (see FIG. 3B) of the tank main body 60. Furthermore, as shown in FIG. 6C, the mesh body 32 is disposed inside the tank main body 60 from the opening 51 of the tank main body 60 to overlap the gasket 31. At this time, the channel tube 61 of the tank main body 60 is inserted through the insertion hole 32*a* (see FIG. 2) of the mesh body 32. Then, as shown in FIG. 6D, the heating assembly 38 is connected to the second end portion 60*b* of the tank main body 60, and the opening 51 is closed. A part of the heating assembly 38 may be inserted into the tank main body 60 through the opening 51.

Figure 6E:
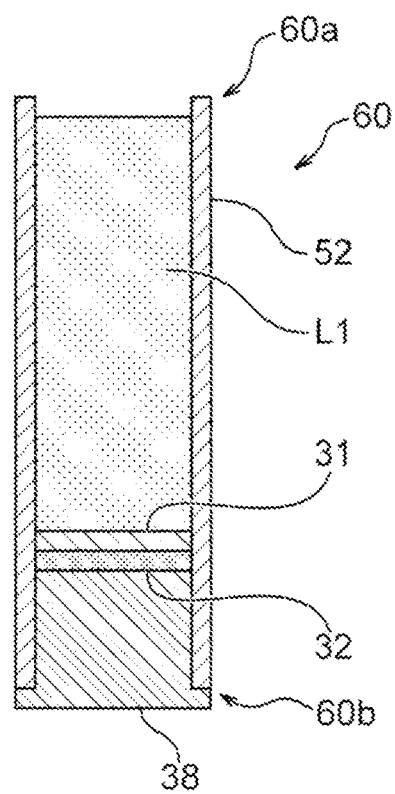
FIG. 6E is a schematic view showing the manufacturing process of the cartridge.
Figure 6F:
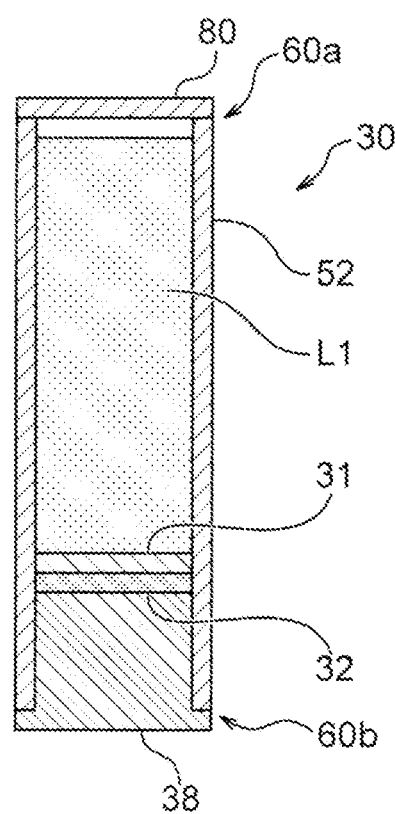
FIG. 6F is a schematic view showing the manufacturing process of the cartridge.

Subsequently, as shown in FIG. 6E, the space 52*a* of the tank main body 60 to which the heating assembly 38 is connected is filled with aerosol source L1. At this time, the tank main body 60 may be installed with the first end portion 60*a* positioned at the top. Lastly, as shown in FIG. 6F, the lid 80 is joined or welded to the first end portion 60*a* of the tank main body 60 by ultrasonic welding, for example, and the cartridge 30 is thus manufactured. When the aerosol source L1 is put in the bottomed tank main body 60 to which the heating assembly 38 is not assembled, up to assembly of the heating assembly 38 has to be completed to prevent leakage of the aerosol source L1 from the tank main body 60. By contrast, according to the processes shown in FIGS. 6A to 6E, the heating assembly 38 can be assembled with the tank main body 60 before filling with the aerosol source L1 is performed, and thus, for example, the tank main body 60 to which the heating assembly 38 is connected as shown in FIG. 6D may be manufactured as one unit and then be transported, and filling with the aerosol source and joining or welding of the lid 80 may be performed as shown in FIGS. 6E and 6F at another place.

In the process shown in FIG. 6F, a part of the first recessed section 68 of the tank main body 60 is desirably filled by a part of the first connection section 90 of the lid 80 (including a leftover material). In other words, the first recessed section 68 is desirably not completely filled by the first connection section 90. The first recessed section 68 is thereby able to contain all the leftover material that is generated by melting of the first connection section 90, and the leftover material may be prevented from sticking out from the first recessed section 68. Furthermore, a part of the second recessed section 69 of the tank main body 60 is desirably filled by a part of the second connection section 92 of the lid 80 (including a leftover material). In other words, the second recessed section 69 is desirably not completely filled by the second connection section 92. The second recessed section 69 is thereby able to contain all the leftover material that is generated by melting of the second connection section 92, and the leftover material may be prevented from sticking out from the second recessed section 69.

In the process shown in FIG. 6F, the first connection section 90 and the second connection section 92 are desirably joined or welded to the tank main body 60 in such a way that the facing surface 80*d* of the lid 80 and the facing surface 65 of the tank main body 60 are not joined or welded to each other. This prevents generation of a leftover material from the facing surface 80*d* and the facing surface 65, and as a result, exposure of a leftover material to outside may be prevented.

In the process shown in FIG. 6F, the first connection section 90 and the second connection section 92 are desirably joined or welded to the tank main body 60 in a state where the lid 80 and the tank main body 60 are positioned relative to each other by fitting the guide section 95 with the first opening 66 (the opening outer edge 66*b*). Furthermore, as shown in FIG. 4B, the guide section 95 extends in parallel to the first connection section 90 and the second connection section 92, and is, in the direction in which the first connection section 90 and the second connection section 92 extend (the longitudinal direction), longer than the first connection section 90 and the second connection 92 before the two are joined or welded to the tank main body 60. Accordingly, the guide section 95 may be fitted in the first opening 66 and the lid 80 and the tank main body 60 may be positioned relative to each other before the first connection section 90 and the second connection section 92 are joined or welded to the tank main body 60.

Heretofore, an embodiment of the present invention has been described, but the present invention is not limited to the embodiment described above, and various modifications may be made within the scope of the claims and within the technical ideas described in the specification and the drawings. Additionally, any shape and material not described explicitly in the specification and the drawings are included in the scope of the technical ideas of the present invention as long as they exhibit the same functions and effects as those of the present invention.

In the following, some of modes disclosed by the present specification will be described.

According to a first mode, there is provided a cartridge that is assembled in a part of a vapor product that includes a heating element for heating an aerosol source. The cartridge includes a first component and a second component, at least one of which being formed of resin, and a connection section whose one end is connected to the first component and whose another end is joined or welded to the second component. The second component includes a recessed section. The other end of the connection section is joined or welded to the recessed section.

According to the first mode, because the second component includes the recessed section to which the other end of the connection section is joined or welded, a melted material from the connection section may be accumulated in the recessed section. Accordingly, the melted material (a leftover material) from the connection section may be prevented from being exposed between the first component and the second component.

A second mode is summarized as the cartridge according to the first mode, the cartridge including an aerosol channel where aerosol that is generated by evaporation of the aerosol source passes through, where at least a part of the aerosol channel is demarcated by at least one of the first component and the second component.

According to the second mode, because the aerosol channel is demarcated by at least one of the first component and the second component, a leftover material may be prevented from being exposed in such an aerosol channel, and condensation of aerosol on a leftover material may be prevented. Furthermore, as described above, the cartridge according to the second mode is formed of resin. Demarcation as described above of the aerosol channel by at least a part of the first component and the second component may be achieved by integrally die-molding each of the components in such a way that there is included a portion that forms a part of the recessed section mentioned above and there is included a portion at which at least a part of the component forms the aerosol channel. This enables an assembly step or a bonding step necessary in the case of molding separate bodies to be omitted, and because there are no fitting sections or bonded parts, the component can be easily handled and is not easily broken when a consumer holds it in his/her hand at the time of use in spite of being a small resin component. However, designs are restricted with respect to shapes of the recessed section and the aerosol channel in such a way that the two components may each be allowed to be integrally die-molded.

A third mode is summarized as the cartridge according to the first mode or the second mode, the cartridge including a space capable of containing the aerosol source, where at least a part of the space is demarcated by at least one of the first component and the second component.

According to the third mode, because at least one of the first component and the second component demarcates a space that is capable of containing the aerosol source, exposure of a leftover material in such a space may be prevented, and erroneous recognition of mixing of a foreign substance in the aerosol source may be prevented. Furthermore, as described above, the cartridge according to the third mode citing the first mode and the second mode is formed of resin. Provision of the space that is capable of containing the aerosol source and demarcation of at least a part of the space by at least one of the first component and the second component described above may be achieved by integrally die-molding each of the components in such a way that there is included a portion that forms a part of the recessed section mentioned above or there is included a portion at which at least a part of the component forms the aerosol channel, and in such a way that there is included a portion that forms the space that is capable of containing the aerosol source. The effects described in the second mode may thus also be obtained.

A fourth mode is summarized as the cartridge according to any one of the first to third modes, where at least a part of the heating element is housed in at least one of the first component and the second component.

According to the fourth mode, because at least one of the first component and the second component houses at least a part of the heating element, exposure of a leftover material to such a heating element may be prevented. Furthermore, the cartridge according to the fourth mode may be easily used at the time of use by a consumer because assembly with the heating element is not required.

A fifth mode is summarized as the cartridge according to any one of the first to fourth modes, where the first component includes a flat plate section, the connection section is a ridge section that has an annular shape and that is provided on a flat surface of the flat plate section, and the recessed section is a groove extending along the ridge section.

According to the fifth mode, the annular ridge section is joined or welded to the annular groove. Accordingly, exposure of a leftover material at an annular joined or welded part may be prevented. Furthermore, when the annular ridge section is joined or welded to the annular groove, a closed space may be formed by the first component, the second component, and the connection section, and such a space may be made a space for containing the aerosol source, for example.

A sixth mode is summarized as the cartridge according to any one of the first to fifth modes, where the first component includes a facing surface that faces the second component, the connection section includes a first connection section and a second connection section, each of the first connection section and the second connection section has one end connected to the first component and another end joined or welded to the second component, and has an annular shape when seen along a direction in which the first connection section and the second connection section extend between the first component and the second component, the second connection section is positioned more inward from the first connection section when seen along the direction in which the second connection section extends between the first component and the second component, and the recessed section includes a first recessed section to which the other end of the first connection section is joined or welded, and a second recessed section to which the other end of the second connection section is joined or welded.

According to the sixth mode, the annular first connection section and the annular second connection section are joined or welded to the first recessed section and the second recessed section, respectively. Accordingly, exposure of a leftover material at an annular joined or welded part may be prevented. Furthermore, when the annular first connection section and the annular second connection section are joined or welded to the first recessed section and the second recessed section, an annular closed space and a separate space inside such a space may be formed by the first component, the second component, the first connection section, and the second connection section. Accordingly, the closed space may be made a space for containing the aerosol source, for example, and the separate space may be made the aerosol channel. Additionally, in the present specification, the "facing surfaces" of the first component and the second component refer to surfaces that directly face each other in a direction in which the connection section extends between the first component and the second component, and members other than the connection section are not present between the facing surface of the first component and the facing surface of the second component. The "facing surfaces" of the first component and the second component may also be said to be surfaces that are at an angle relative to the direction in which the connection section extends between the first component and the second component.

A seventh mode is summarized as the cartridge according to the sixth mode, where the first connection section and the second connection section are disposed substantially concentrically on a cross-section perpendicular to the first direction.

According to the seventh mode, a separate space may be formed at a center of the annular closed space in the first component and the second component. Accordingly, the space at the center may be made the aerosol channel.

An eighth mode is summarized as the cartridge according to any one of the first to seventh modes, where the recessed section includes a bottom section, and the other end of the connection section is joined or welded to the bottom section of the recessed section.

According to the eighth mode, because the other end of the connection section is joined or welded to the bottom section of the recessed section, a melted material (a leftover material) from the connection section may be accumulated in the bottom section, and the leftover material may be efficiently contained in the recessed section.

A ninth mode is summarized as the cartridge according to the eighth mode, where the recessed section includes a side wall section, and the side wall section includes a tapered surface that causes a width of the recessed section to be reduced toward the bottom section.

According to the ninth mode, the other end of the joining section is guided along the tapered surface at a time of joining or welding of the other end of the connection section to the recessed section, and thus, the other end of the connection section may be easily joined or welded to the bottom section of the recessed section.

A tenth mode is summarized as the cartridge according to any one of the first to ninth modes, where a part of the recessed section of the second component is filled by a part of the connection section.

According to the tenth mode, a part of the recessed section is filled by the connection section, or in other words, the recessed section is not completely filled by the connection section, and thus, the recessed section may contain all the melted material (a leftover material) from the connection section, and the leftover material may be prevented from sticking out from the recessed section.

According to an eleventh mode, there is provided a manufacturing method of the cartridge according to any one of the first to tenth modes. In the manufacturing method of the cartridge, the first component is a lid member, and the second component is a cylindrical member. The manufacturing method of the cartridge includes connecting a heating assembly including the heating element to one end of the cylindrical member and closing an opening on the one end of the cylindrical member, filling an inside of the cylindrical member, to which the heating assembly is connected, with the aerosol source, and joining or welding the connection section to another end of the cylindrical member filled with the aerosol source.

When the aerosol source is put in a cylindrical member with a bottom to which the heating assembly is not assembled, up to assembly of the heating assembly has to be completed to prevent leakage of the aerosol source from the cylindrical member. By contrast, according to the eleventh mode, the heating assembly can be assembled with the cylindrical member before filling with the aerosol source is performed, and thus, for example, the cylindrical member to which the heating assembly is connected may be manufactured in advance as one unit and then be transported, and filling with the aerosol source and joining or welding of the lid member may be performed at another place.

A twelfth mode is summarized as the cartridge according to the eleventh mode, the cartridge including ultrasonically welding the connection section of the lid member to the other end of the cylindrical member.

According to a thirteenth mode, there is provided a manufacturing method of the cartridge according to any one of the first to tenth modes. The manufacturing method of the cartridge includes joining or welding the connection section of the first component to the second component, and filling a part of the recessed section of the second component by a part of the connection section.

According to the thirteenth mode, a part of the recessed section is filled by the connection section, or in other words, the recessed section is not completely filled by the connection section, and thus, the recessed section may contain all the melted material (a leftover material) from the connection section, and the leftover material may be prevented from sticking out from the recessed section.

According to a fourteenth mode, there is provided a cartridge including a heating element for heating an aerosol source. The cartridge includes a first component and a second component, at least one of which being formed of resin, and a connection section whose one end is connected to the first component and whose another end is joined or welded to the second component. The second component includes a facing surface that faces the first component, and an outermost edge of the facing surface. The other end of the connection section is joined or welded to the facing surface of the second component, at a position away from the outermost edge.

According to the fourteenth mode, because the connection section is at a position away from the outermost edge of the facing surface of the second component, a melted material (a leftover material) from the connection section may be prevented from being exposed from the outermost edge of the facing surface of the second component. Additionally, in the present specification, the "facing surfaces" of the first component and the second component refer to surfaces that directly face each other in the direction in which the connection section extends between the first component and the second component, and members other than the connection section are not present between the facing surface of the first component and the facing surface of the second component. The "facing surfaces" of the first component and the second component may also be said to be surfaces that are at an angle relative to the direction in which the connection section extends between the first component and the second component.

A fifteenth mode is summarized as the cartridge according to the fourteenth mode, the cartridge including an aerosol channel where aerosol that is generated by evaporation of the aerosol source passes through, where at least a part of the aerosol channel is demarcated by at least one of the first component and the second component.

According to the fifteenth mode, because the aerosol channel is demarcated by at least one of the first component and the second component, a leftover material may be prevented from being exposed in such an aerosol channel, and condensation of aerosol on a leftover material may be prevented. Furthermore, as described above, the cartridge according to the fifteenth mode is formed of resin. Demarcation as described above of the aerosol channel by at least a part of the first component and the second component may be achieved by integrally die-molding each of the components in such a way that there is included a portion that forms a part of the recessed section mentioned above and there is included a portion at which at least a part of the component forms the aerosol channel. This enables an assembly step or a bonding step necessary in the case of molding separate bodies to be omitted, and because there are no fitting sections or bonded parts, the component can be easily handled and is not easily broken when a consumer holds it in his/her hand at the time of use in spite of being a small resin component. However, designs are restricted with respect to shapes of the recessed section and the aerosol channel in such a way that the two components may each be allowed to be integrally die-molded.

A sixteenth mode is summarized as the cartridge according to the fourteenth or fifteenth mode, the cartridge including a space capable of containing the aerosol source, where at least a part of the space is demarcated by at least one of the first component and the second component.

According to the sixteenth mode, because at least one of the first component and the second component demarcates a space that is capable of containing the aerosol source, exposure of a leftover material in such a space may be prevented, and erroneous recognition of mixing of a foreign substance in the aerosol source may be prevented. Furthermore, as described above, the cartridge according to the sixteenth mode citing the fourteenth mode and the fifteenth mode is formed of resin. Provision of the space that is capable of containing the aerosol source and demarcation of at least a part of the space by at least one of the first component and the second component described above may be achieved by integrally die-molding each of the components in such a way that there is included a portion that forms a part of the recessed section mentioned above or there is included a portion at which at least a part of the component forms the aerosol channel, and in such a way that there is included a portion that forms the space that is capable of containing the aerosol source. The effects described in the fifteenth mode may thus also be obtained.

A seventeenth mode is summarized as the cartridge according to any one of the fourteenth to sixteenth modes, where at least a part of the heating element is housed in at least one of the first component and the second component.

According to the seventeenth mode, because at least one of the first component and the second component houses at least a part of the heating element, exposure of a leftover material to such a heating element may be prevented. Furthermore, the cartridge according to the seventeenth mode may be easily used at the time of use by a consumer because assembly with the heating element is not required.

An eighteenth mode is summarized as the cartridge according to any one of the fourteenth to seventeenth modes, where the second component includes a first opening formed in the facing surface, and a first opening edge that demarcates at least a part of the first opening, and the other end of the connection section is joined or welded to the end surface of the second component, at a position away from the first opening edge.

According to the eighteenth mode, exposure of a leftover material in the first opening may be prevented.

A nineteenth mode is summarized as the cartridge according to the eighteenth mode, where the first opening has an annular shape when seen along a direction in which the connection section extends between the first component and the second component, the first opening edge includes an opening outer edge and an opening inner edge that demarcate the first opening, the connection section includes a first connection section and a second connection section, each of the first connection section and the second connection section has one end connected to the first component and another end joined or welded to the second component, and has an annular shape when seen along a direction in which the first connection section and the second connection section extend between the first component and the second component, the second connection section is positioned more inward from the first connection section when seen along the direction in which the second connection section extends between the first component and the second component, the other end of the first connection section is joined or welded to the second component, at a position away from the opening outer edge, and the other end of the second connection section is joined or welded to the second component, at a position away from the opening inner edge.

According to the nineteenth mode, melted materials (leftover materials) from the first connection section and the second connection section may be prevented from being exposed in the first opening.

A twentieth mode is summarized as the cartridge according to the nineteenth mode, where the second component includes a second opening that is positioned more inward from the first opening when seen along the direction in which the second connection section extends between the first component and the second component, and a second opening edge that demarcates at least a part of the second opening, and the other end of the second connection section is joined or welded to the second component, at a position away from the second opening edge.

According to the twentieth mode, a melted material (a leftover material) from the second connection section may be prevented from being exposed in the second opening.

A twenty-first mode is summarized as the cartridge according to any one of the fourteenth to twentieth modes, where the first component includes an extending section that extends, in a direction perpendicular to a direction of extension of the connection section, from the one end of the connection section toward the outermost edge of the second component.

According to the twenty-first mode, because the first component includes the extending section, a leftover material may be prevented from being exposed to outside from a gap between the first component and the second component.

According to a twenty-second mode, there is provided a manufacturing method of the cartridge according to any one of the fourteenth to twenty-first mode. In the manufacturing method of the cartridge, the first component is a lid member, and the second component is a cylindrical member. The manufacturing method of the cartridge includes connecting a heating assembly including the heating element to one end of the cylindrical member and closing an opening on the one end of the cylindrical member, filling an inside of the cylindrical member, to which the heating assembly is connected, with the aerosol source, and joining or welding the connection section to another end of the cylindrical member filled with the aerosol source.

When the aerosol source is put in a cylindrical member with a bottom to which the heating assembly is not assembled, up to assembly of the heating assembly has to be completed to prevent leakage of the aerosol source from the cylindrical member. By contrast, according to the twenty-second mode, the heating assembly can be assembled with the cylindrical member before filling with the aerosol source is performed, and thus, for example, the cylindrical member to which the heating assembly is connected may be manufactured in advance as one unit and then be transported, and filling with the aerosol source and joining or welding of the lid member may be performed at another place.

A twenty-third mode is summarized as the manufacturing method of the cartridge according to the twenty-second mode, the manufacturing method including ultrasonically welding the connection section of the lid member to the other end of the cylindrical member.

According to a twenty-fourth mode, there is provided a cartridge that is assembled in a part of a vapor product that includes a heating element for heating an aerosol source. The cartridge includes a first component and a second component, at least one of which being formed of resin, and a connection section whose one end is connected to the first component and whose another end is joined or welded to the second component. The first component includes a first facing surface that faces the second component, and a first outermost edge of the first facing surface. The second component includes a second facing surface that faces the first component, and a second outermost edge of the second facing surface. The first outermost edge and the second component are not joined or welded to each other, and the second outermost edge and the first component are not joined or welded to each other.

When the first outermost edge or the second outermost edge is joined or welded to a component, a melted material (a leftover material) from these parts is exposed to outside the components. According to the twenty-fourth mode, the first outermost edge of the first component and the second outermost edge of the second component are not joined or welded to any part, and thus, the first outermost edge and the second outermost edge are not melted, and exposure of leftover materials therefrom to outside the components may be prevented. Additionally, in the present specification, the "first facing surface" of the first component and the "second facing surface" of the second component are surfaces of the first component and the second component that directly face each other in the direction in which the connection section extends between the first component and the second component. Members other than the connection section are not present between the facing surface of the first component and the facing surface of the second component. The "facing surfaces" of the first component and the second component may also be said to be surfaces that are at an angle relative to the direction in which the connection section extends between the first component and the second component.

A twenty-fifth mode is summarized as the cartridge according to the twenty-fourth mode, the cartridge including an aerosol channel where aerosol that is generated by evaporation of the aerosol source passes through, where at least a part of the aerosol channel is demarcated by at least one of the first component and the second component.

According to the twenty-fifth mode, because the aerosol channel is demarcated by at least one of the first component and the second component, a leftover material may be prevented from being exposed in such an aerosol channel, and condensation of aerosol on a leftover material may be prevented. Furthermore, as described above, the cartridge according to the twenty-fifth mode is formed of resin. Demarcation as described above of the aerosol channel by at least a part of the first component and the second component may be achieved by integrally die-molding each of the components in such a way that there is included a portion that forms a part of the recessed section mentioned above and there is included a portion at which at least a part of the component forms the aerosol channel. This enables an assembly step or a bonding step necessary in the case of molding separate bodies to be omitted, and because there are no fitting sections or bonded parts, the component can be easily handled and is not easily broken when a consumer holds it in his/her hand at the time of use in spite of being a small resin component. However, designs are restricted with respect to shapes of the recessed section and the aerosol channel in such a way that the two components may each be allowed to be integrally die-molded.

A twenty-sixth mode is summarized as the cartridge according to the twenty-fourth or twenty-fifth mode, the cartridge including a space capable of containing the aerosol source, where at least a part of the space is demarcated by at least one of the first component and the second component.

According to the twenty-sixth mode, because at least one of the first component and the second component demarcates a space that is capable of containing the aerosol source, exposure of a leftover material in such a space may be prevented, and erroneous recognition of mixing of a foreign substance in the aerosol source may be prevented. Furthermore, as described above, the cartridge according to the twenty-sixth mode citing the twenty-fourth mode and the twenty-fifth mode is formed of resin. Provision of the space that is capable of containing the aerosol source and demarcation of at least a part of the space by at least one of the first component and the second component described above may be achieved by integrally die-molding each of the components in such a way that there is included a portion that forms a part of the recessed section mentioned above or there is included a portion at which at least a part of the component forms the aerosol channel, and in such a way that there is included a portion that forms the space that is capable of containing the aerosol source. The effects described in the twenty-fifth mode may thus also be obtained.

A twenty-seventh mode is summarized as the cartridge according to any one of the twenty-fourth to twenty-sixth modes, where at least a part of the heating element is housed in at least one of the first component and the second component.

According to the twenty-seventh mode, because at least one of the first component and the second component houses at least a part of the heating element, exposure of a leftover material to such a heating element may be prevented. Furthermore, the cartridge according to the twenty-seventh mode may be easily used at the time of use by a consumer because assembly with the heating element is not required.

A twenty-eighth mode is summarized as the cartridge according to any one of the twenty-fourth to twenty-seventh modes, where the first outermost edge and the second outermost edge are not joined or welded to each other.

When the first outermost edge of the first component and the second outermost edge of the second component are joined or welded to each other, a leftover material is exposed from the first outermost edge and the second outermost edge. By contrast, according to the twenty-eighth mode, because the first outermost edge and the second outermost edge are not joined or welded to each other, exposure of a leftover material from the first outermost edge and the second outermost edge may be prevented.

A twenty-ninth mode is summarized as the cartridge according to the twenty-eighth mode, the cartridge including a gap between the first outermost edge and the second outermost edge.

According to the twenty-ninth mode, because there is a gap where a leftover material generated between the first component and the second component may be retained, exposure, to outside, of the leftover material generated from the connection section that is joined or welded to the second component may be better prevented.

A thirtieth mode is summarized as the cartridge according to any one of the twenty-fourth to twenty-ninth modes, where the second component includes a first opening formed in the second facing surface, and a first opening edge that demarcates at least a part of the first opening, and the first opening edge is not joined or welded to the first component.

According to the thirtieth mode, because the first opening edge is not joined or welded to the first component, a leftover material is not generated from the first opening edge, and exposure of a leftover material in the first opening may be prevented.

A thirty-first mode is summarized as the cartridge according to the thirtieth mode, where the first opening has an annular shape when seen along a direction in which the connection section extends between the first component and the second component, the first opening edge includes an opening outer edge and an opening inner edge that demarcate the first opening, and the opening outer edge and the opening inner edge are not joined or welded to the first component.

According to the thirty-first mode, because the opening outer edge and the opening inner edge are not joined or welded to the first component, exposure of a leftover material from the opening outer edge and the opening inner edge in the first opening may be prevented.

A thirty-second mode is summarized as the cartridge according to the thirty-first mode, where the second component includes a second opening that is formed in the second facing surface and that is positioned more inward from the first opening when seen along the direction in which the connection section extends between the first component and the second component, and a second opening edge that demarcates at least a part of the second opening, and the second opening edge is not joined or welded to the first component.

According to the thirty-second mode, because the second opening edge is not joined or welded to the first component, a leftover material is not generated from the second opening edge, and exposure of a leftover material in the second opening may be prevented.

A thirty-third mode is summarized as the cartridge according to any one of the twenty-fourth to thirty-second modes, where the first facing surface of the first component and the second facing surface of the second component are not joined or welded to each other.

According to the thirty-third mode, because the first facing surface of the first component and the second facing surface of the second component are not joined or welded to each other, a leftover material may be prevented from being generated from the first facing surface and the second facing surface, and as a result, exposure of a leftover material to outside may be prevented.

According to a thirty-fourth mode, there is provided a manufacturing method of the cartridge according to any one of the twenty-fourth to thirty-third modes. In the manufacturing method of the cartridge, the first component is a lid member, and the second component is a cylindrical member. The manufacturing method of the cartridge includes connecting a heating assembly including the heating element to one end of the cylindrical member and closing an opening on the one end of the cylindrical member, filling an inside of the cylindrical member, to which the heating assembly is connected, with the aerosol source, and joining or welding the connection section to another end of the cylindrical member filled with the aerosol source.

When the aerosol source is put in a cylindrical member with a bottom to which the heating assembly is not assembled, up to assembly of the heating assembly has to be completed to prevent leakage of the aerosol source from the cylindrical member. By contrast, according to the thirty-fourth mode, the heating assembly can be assembled with the cylindrical member before filling with the aerosol source is performed, and thus, for example, the cylindrical member to which the heating assembly is connected may be manufactured in advance as one unit and then be transported, and filling with the aerosol source and joining or welding of the lid member may be performed at another place.

A thirty-fifth mode is summarized as the manufacturing method of the cartridge according to the thirty-third mode, the manufacturing method including ultrasonically welding the connection section of the lid member to the other end of the cylindrical member.

According to a thirty-sixth mode, there is provided the manufacturing method of the cartridge according to any one of the twenty-fourth to thirty-third modes. The manufacturing method of the cartridge includes joining or welding the other end of the connection section to the second component in such a way that the first facing surface of the first component and the second facing surface of the second component are not joined or welded to each other.

According to the thirty-sixth mode, because the first facing surface of the first component and the second facing surface of the second component are not joined or welded to each other, a leftover material may be prevented from being generated from the first facing surface and the second facing surface, and as a result, exposure of a leftover material to outside may be prevented.

According to a thirty-seventh mode, there is provided a cartridge that is assembled in a part of a vapor product that includes a heating element for heating an aerosol source. The cartridge includes a first component and a second component, at least one of which being formed of resin, a connection section that extends between the first component and the second component, with one end connected to the first component and another end connected to the second component, and a guide section that extends from the first component, and that is not joined or welded to the second component. The second component includes a receiving section where the guide section fits.

According to the thirty-seventh mode, the first component includes the guide section, and the second component includes the receiving section, and thus, when connecting the first component and the second component by the connection section, the first component may be positioned relative to the second component by fitting the guide section in the receiving section. Furthermore, because the guide section is not joined or welded to the second component, generation of a leftover material from the guide section may be prevented. Additionally, to "fit" in the present specification refers not only to a case where the guide section and the receiving section are fitted together without a gap, but also to a case where the guide section is fitted in the receiving section with a gap provided between the guide section and the receiving section, the gap being such that the position of the connection section relative to the second component may be guided to an allowable range. That is, to "fit" in the present specification may also mean to "loosely fit".

A thirty-eighth mode is summarized as the cartridge according to the thirty-seventh mode, the cartridge including an aerosol channel where aerosol that is generated by evaporation of the aerosol source passes through, where at least a part of the aerosol channel is demarcated by at least one of the first component and the second component.

According to the thirty-eighth mode, at least one of the first component and the second component demarcates the aerosol channel, and thus, at a time of connecting the first component and the second component by the connection section, positioning of the connection section and the first component relative to the second component may be performed at the component that demarcates such an aerosol channel, by fitting the guide section in the receiving section. Furthermore, a leftover material may be prevented from being generated from the guide section at the component that demarcates the aerosol channel. Furthermore, as described above, the cartridge according to the thirty-eighth mode is formed of resin. Demarcation as described above of the aerosol channel by at least a part of the first component and the second component may be achieved by integrally die-molding each of the components in such a way that there is included a portion at which at least a part of the component forms the aerosol channel. This enables an assembly step or a bonding step necessary in the case of molding separate bodies to be omitted, and because there are no fitting sections or bonded parts, the component can be easily handled and is not easily broken when a consumer holds it in his/her hand at the time of use in spite of being a small resin component. However, the design is restricted with respect to shape of the aerosol channel in such a way that the two components may each be allowed to be integrally die-molded.

A thirty-ninth mode is summarized as the cartridge according to the thirty-seventh or thirty-eighth mode, the cartridge including a space capable of containing the aerosol source, where at least a part of the space is demarcated by at least one of the first component and the second component.

According to the thirty-ninth mode, at least one of the first component and the second component demarcates the space capable of containing the aerosol source, and thus, at a time of connecting the first component and the second component by the connection section, positioning of the connection section and the first component relative to the second component may be performed at the component that demarcates such a space, by fitting the guide section in the receiving section. Furthermore, a leftover material may be prevented from being generated from the guide section at the component that demarcates the space. Furthermore, as described above, the cartridge according to the thirty-ninth mode citing the thirty-seventh and thirty-eighth modes is formed of resin. Provision of the space that is capable of containing the aerosol source and demarcation of at least a part of the space by at least one of the first component and the second component described above may be achieved by integrally die-molding each of the components in such a way that there is included a portion at which at least a part of the component forms the aerosol channel and there is included a portion that forms the space that is capable of containing the aerosol source. The effects described in the thirty-eighth mode may thus also be obtained.

A fortieth mode is summarized as the cartridge according to any one of the thirty-seventh to thirty-ninth modes, where at least a part of the heating element is housed in at least one of the first component and the second component.

According to the fortieth mode, at least one of the first component and the second component houses at least a part of the heating element, and thus, at a time of connecting the first component and the second component by the connection section, positioning of the connection section and the first component relative to the second component may be performed at the component that houses such a heating element, by fitting the guide section in the receiving section. Furthermore, a leftover material may be prevented from being generated from the guide section at the component that houses the heating element. Furthermore, the cartridge according to the fortieth mode may be easily used at the time of use by a consumer because assembly with the heating element is not required.

A forty-first mode is summarized as the cartridge according to any one of the thirty-seventh to fortieth modes, where the guide section is disposed to overlap the other end of the connection section when seen along a direction perpendicular to a direction in which the connection section extends between the first component and the second component.

According to the forty-first mode, because the guide section is disposed to cover the other end of the connection section from a side, a leftover material that is generated when the connection section is joined or welded to the second component is covered by the guide section and is prevented from being exposed.

A forty-second mode is summarized as the cartridge according to any one of the thirty-seventh to forty-first modes, where the second component includes a facing surface that faces the first component, a first opening formed in the facing surface, and a first opening edge that demarcates at least a part of the first opening, and the receiving section is the first opening.

According to the forty-second mode, the connection section and the first component may be positioned relative to the second component by fitting the guide section in the first opening. At this time, because the guide section is fitted in the first opening, a leftover material that is generated from the connection section is prevented by the guide section from being exposed to the first opening. In other words, the guide section may prevent the leftover material from entering the first opening. Additionally, in the present specification, the "facing surfaces" of the first component and the second component refer to surfaces that directly face each other in the direction in which the connection section extends between the first component and the second component. Members other than the connection section are not present between the facing surface of the first component and the facing surface of the second component. The "facing surfaces" of the first component and the second component may also be said to be surfaces that are at an angle relative to the direction in which the connection section extends between the first component and the second component.

A forty-third mode is summarized as the cartridge according to the forty-second mode, where the first opening has an annular shape when seen along a direction in which the connection section extends between the first component and the second component, the first opening edge includes an opening outer edge and an opening inner edge that demarcate the first opening, and the guide section fits with the opening outer edge or the opening inner edge, the guide section having an annular shape when seen along the direction in which the connection section extends between the first component and the second component.

According to the forty-third mode, the guide section having an annular shape is fitted with the opening outer edge or the opening inner edge of the first opening, and the connection section and the first component may thus be positioned relative to the second component. At this time, because the guide section is fitted with the opening outer edge or the opening inner edge, a leftover material that is generated from the connection section may be prevented by the guide section from being exposed to the first opening. In other words, the guide section may prevent the leftover material from entering the first opening.

According to a forty-fourth mode, there is provided a manufacturing method of the cartridge according to any one of the thirty-seventh to forty-third modes. In the manufacturing method of the cartridge, the first component is a lid member, and the second component is a cylindrical member. The manufacturing method of the cartridge includes connecting a heating assembly including the heating element to one end of the cylindrical member and closing an opening on the one end of the cylindrical member, filling an inside of the cylindrical member, to which the heating assembly is connected, with the aerosol source, and joining or welding the connection section to another end of the cylindrical member filled with the aerosol source.

When the aerosol source is put in a cylindrical member with a bottom to which the heating assembly is not assembled, up to assembly of the heating assembly has to be completed to prevent leakage of the aerosol source from the cylindrical member. By contrast, according to the forty-fourth mode, the heating assembly can be assembled with the cylindrical member before filling with the aerosol source is performed, and thus, for example, the cylindrical member to which the heating assembly is connected may be manufactured in advance as one unit and then be transported, and filling with the aerosol source and joining or welding of the lid member may be performed at another place.

A forty-fifth mode is summarized as the manufacturing method of the cartridge according to the forty-fourth mode, the manufacturing method including ultrasonically welding the connection section of the lid member to the other end of the cylindrical member.

According to a forty-sixth mode, there is provided a manufacturing method of the cartridge according to any one of the thirty-seventh to forty-third modes. The manufacturing method of the cartridge includes fitting the guide section in the receiving section and positioning the first component and the second component relative to each other, and joining or welding the other end of the connection section to the second component.

According to the forty-sixth mode, at the time of joining or welding, to the second component, the connection section that is connected to the first component, the connection section and the first component may be positioned relative to the second component by fitting the guide section in the receiving section.

A forty-seventh mode is summarized as the manufacturing method of the cartridge according to the forty-sixth mode, where the guide section extends in parallel to the connection section, and is, in a direction in which the connection section extends, longer than the connection section before the connection section is joined or welded to the second component, and the manufacturing method includes fitting the guide section in the receiving section and positioning the first component and the second component relative to each other before the other end of the connection section is joined or welded to the second component.

According to the forty-seventh mode, because the guide section is longer than the connection section that is not yet joined or welded to the second component, the first component and the second component may be positioned relative to each other before the connection section that is connected to the first component is joined or welded to the second component.

According to a forty-eighth mode, there is provided a vapor product including the cartridge according to any one of the first to forty-seventh modes.

REFERENCE SIGNS LIST

30: cartridge
33b: heating wire
38: heating assembly
50: tank
51: opening
52: circumferential wall
52a: space
60: tank main body
60a: first end portion
60b: second end portion
61a: aerosol channel
65: facing surface
65a: outermost edge
66: first opening
66a: opening inner edge
66b: opening outer edge
67: second opening
67a: second opening edge
68: first recessed section
68a: bottom section
68b: tapered surface
69: second recessed section
69a: bottom section
69b: tapered surface
80: lid
80a: flat plate section
80b: opening
80c: outermost edge
80d: facing surface
80e: opening edge
82: extending section
90: first connection section
92: second connection section
95: guide section
100: vapor product
L1: aerosol source

The invention claimed is:

1. A cartridge that is assembled in a part of a vapor product that includes a heating element for heating an aerosol source, the cartridge comprising:
   a first component and a second component, at least one of which being formed of resin;
   wherein the first component and the second component are each single components,
   wherein the first component includes a first facing surface that faces the second component in the longitudinal direction, and a first outermost edge of the first facing surface,
   wherein the second component includes a second facing surface that directly faces the first facing surface of the first component in the longitudinal direction, and a second outermost edge of the second facing surface,
   wherein the first facing surface and the second facing surface extend in a direction perpendicular to the longitudinal direction,
   wherein the cartridge includes a connection section extending in the longitudinal direction of the cartridge, having a first end connected to the first facing surface of the first component and a second end welded to the second facing surface of the second component, wherein the first outermost edge and the second outermost edge are not welded to each other, wherein the first outermost edge and the second outermost edge directly face each other in the longitudinal direction and have a gap extending in the longitudinal direction between the first outermost edge and the second outermost edge, and wherein the connection section is connected to the first facing surface at a position inward of the first outermost edge and is welded to the second facing surface at a position inward of the second outermost edge.

2. The cartridge according to claim 1, comprising an aerosol channel where aerosol that is generated by evaporation of the aerosol source passes through, wherein at least a part of the aerosol channel is demarcated by at least one of the first component and the second component.

3. The cartridge according to claim 1, comprising a space capable of containing the aerosol source, wherein at least a part of the space is demarcated by at least one of the first component and the second component.

4. The cartridge according to claim 1, wherein at least a part of the heating element is housed in at least one of the first component and the second component.

5. The cartridge according to claim 1, wherein the first facing surface of the first component and the second facing surface of the second component are not joined or welded to each other.

6. A manufacturing method of the cartridge according to claim 1, the manufacturing method comprising joining or welding the second end of the connection section to the second component in such a way that the first facing surface of the first component and the second facing surface of the second component are not joined or welded to each other.

7. The cartridge according to claim 1, wherein the second component includes a circumferential wall and a channel tube that demarcates an aerosol channel where aerosol passes through, and wherein the circumferential wall and the channel tube extend in the longitudinal direction.

8. The cartridge according to claim 1, wherein the second component includes a first opening formed in the second facing surface, and a first opening edge that demarcates at least a part of the first opening, and wherein the first opening edge is not joined or welded to the first component.

9. The cartridge according to claim 8, wherein the first opening has an annular shape when seen along a direction in which the connection section extends between the first component and the second component, wherein the first opening edge includes an opening outer edge and an opening inner edge that demarcate the first opening, and wherein the opening outer edge and the opening inner edge are not joined or welded to the first component.

10. The cartridge according to claim 9, wherein the second component includes a second opening that is formed in the second facing surface and that is positioned more inward from the first opening when seen along the direction in which the connection section extends between the first component and the second component, and a second opening edge that demarcates at least a part of the second opening, and wherein the second opening edge is not joined or welded to the first component.

11. A manufacturing method of the cartridge according to claim 1, wherein the first component is a lid member, and the second component is a cylindrical member, and wherein the manufacturing method comprises:
connecting a heating assembly including the heating element to a first end of the cylindrical member and closing an opening on the first end of the cylindrical member;
filling an inside of the cylindrical member, to which the heating assembly is connected, with the aerosol source; and
welding the connection section to a second end of the cylindrical member filled with the aerosol source.

12. The manufacturing method of the cartridge according to claim 11, comprising ultrasonically welding the connection section to the second end of the cylindrical member.

* * * * *